(12) United States Patent
Maeda

(10) Patent No.: US 8,842,307 B2
(45) Date of Patent: Sep. 23, 2014

(54) AUTHENTICATION APPARATUS, AUTHENTICATION SYSTEM, AUTHENTICATION METHOD, AND RECORDING MEDIUM HAVING AUTHENTICATION PROGRAM RECORDED THEREON

(75) Inventor: Toshihiro Maeda, Sakai (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1227 days.

(21) Appl. No.: 12/491,377

(22) Filed: Jun. 25, 2009

(65) Prior Publication Data

US 2010/0027046 A1 Feb. 4, 2010

(30) Foreign Application Priority Data

Jul. 29, 2008 (JP) ................. 2008-195188

(51) Int. Cl.
*G06K 15/02* (2006.01)
*G06F 3/12* (2006.01)
*H04N 1/00* (2006.01)
*G06F 21/00* (2013.01)
*G06F 7/04* (2006.01)
*G03G 15/00* (2006.01)
*G06F 21/60* (2013.01)

(52) U.S. Cl.
CPC .......... *G06F 21/608* (2013.01); *G03G 15/5066* (2013.01); *G06K 15/02* (2013.01)
USPC ........ 358/1.14; 358/1.15; 358/1.16; 358/501; 358/401; 713/182; 713/186; 726/2; 726/3; 726/4; 340/5.2

(58) Field of Classification Search
CPC .................................. G06K 15/4095
See application file for complete search history.

(56) References Cited

U.S. PATENT DOCUMENTS 6,545,767 B1 * 4/2003 Kuroyanagi ................. 358/1.14
8,103,634 B2 * 1/2012 Saito ............................ 707/661
(Continued)

FOREIGN PATENT DOCUMENTS

JP 2002-064483 A 2/2002
JP 2002-127545 5/2002
(Continued)

OTHER PUBLICATIONS

Notice of Grounds of Rejection issued in the corresponding Japanese Patent Application No. 2008-195188 dated Jun. 8, 2010, and an English Translation thereof.

*Primary Examiner* — King Poon
*Assistant Examiner* — Beniyam Menberu
(74) *Attorney, Agent, or Firm* — Buchanan Ingersoll & Rooney PC

(57) ABSTRACT

Print data including a provisional registration command is received. When the print data including the provisional registration command is received, an authentication code is obtained. The authentication code is stored in a user information DB. Provisional registration data is obtained from the user information DB. Then, a list of provisional registration data is displayed. It is determined whether the provisional registration data is selectively input or not. If the provisional registration data is selectively input, user information in which IC card information or biological information and the authentication code are associated with each other is transmitted to an authentication server. The authentication server executes a process of registering the received user information.

11 Claims, 23 Drawing Sheets

(56) References Cited

U.S. PATENT DOCUMENTS

| | | |
|---|---|---|
| 2002/0046353 A1 | 4/2002 | Kishimoto |
| 2004/0190038 A1* | 9/2004 | Shahindoust ................. 358/1.14 |
| 2007/0118758 A1* | 5/2007 | Takahashi et al. ............ 713/186 |
| 2007/0234421 A1* | 10/2007 | Ogino et al. .................... 726/19 |
| 2008/0094657 A1* | 4/2008 | Ikegami et al. .............. 358/1.15 |
| 2008/0178265 A1* | 7/2008 | Tsuchiya et al. .................. 726/3 |
| 2008/0204798 A1* | 8/2008 | Taniguchi et al. ........... 358/1.15 |
| 2008/0256459 A1* | 10/2008 | Sekiya .......................... 715/741 |
| 2008/0259397 A1* | 10/2008 | Uehara ........................ 358/1.15 |
| 2009/0025072 A1* | 1/2009 | Kondo .............................. 726/7 |
| 2009/0268224 A1* | 10/2009 | Takahashi .................... 358/1.14 |
| 2009/0300757 A1* | 12/2009 | Tanaka et al. ................... 726/20 |
| 2010/0002249 A1* | 1/2010 | Nuggehalli et al. ......... 358/1.14 |
| 2010/0002250 A1* | 1/2010 | Sakagami et al. ........... 358/1.14 |

FOREIGN PATENT DOCUMENTS

| | | | | |
|---|---|---|---|---|
| JP | 2002-251573 | | 9/2002 | |
| JP | 2006-099724 | | 4/2006 | |
| JP | 2008-021222 | | 1/2008 | |
| JP | 2008-033403 | * | 2/2008 | ................ G06F 3/12 |

* cited by examiner

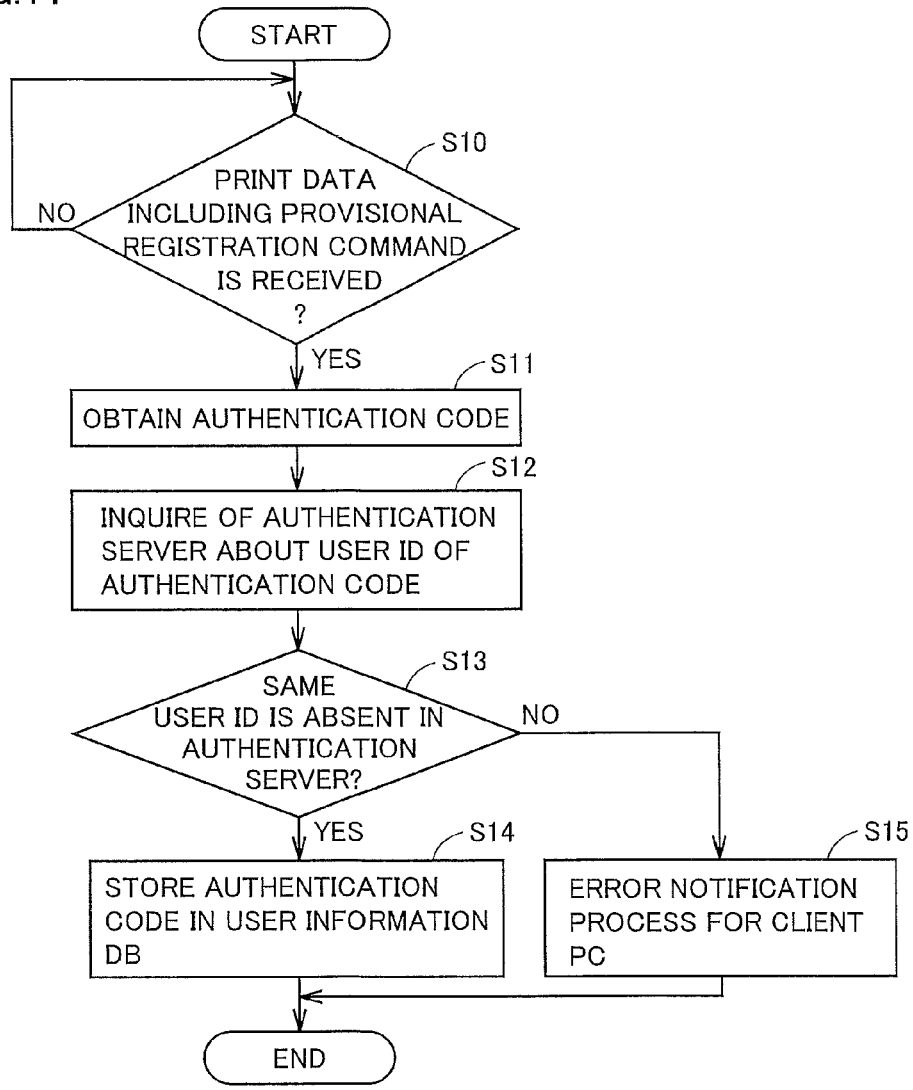

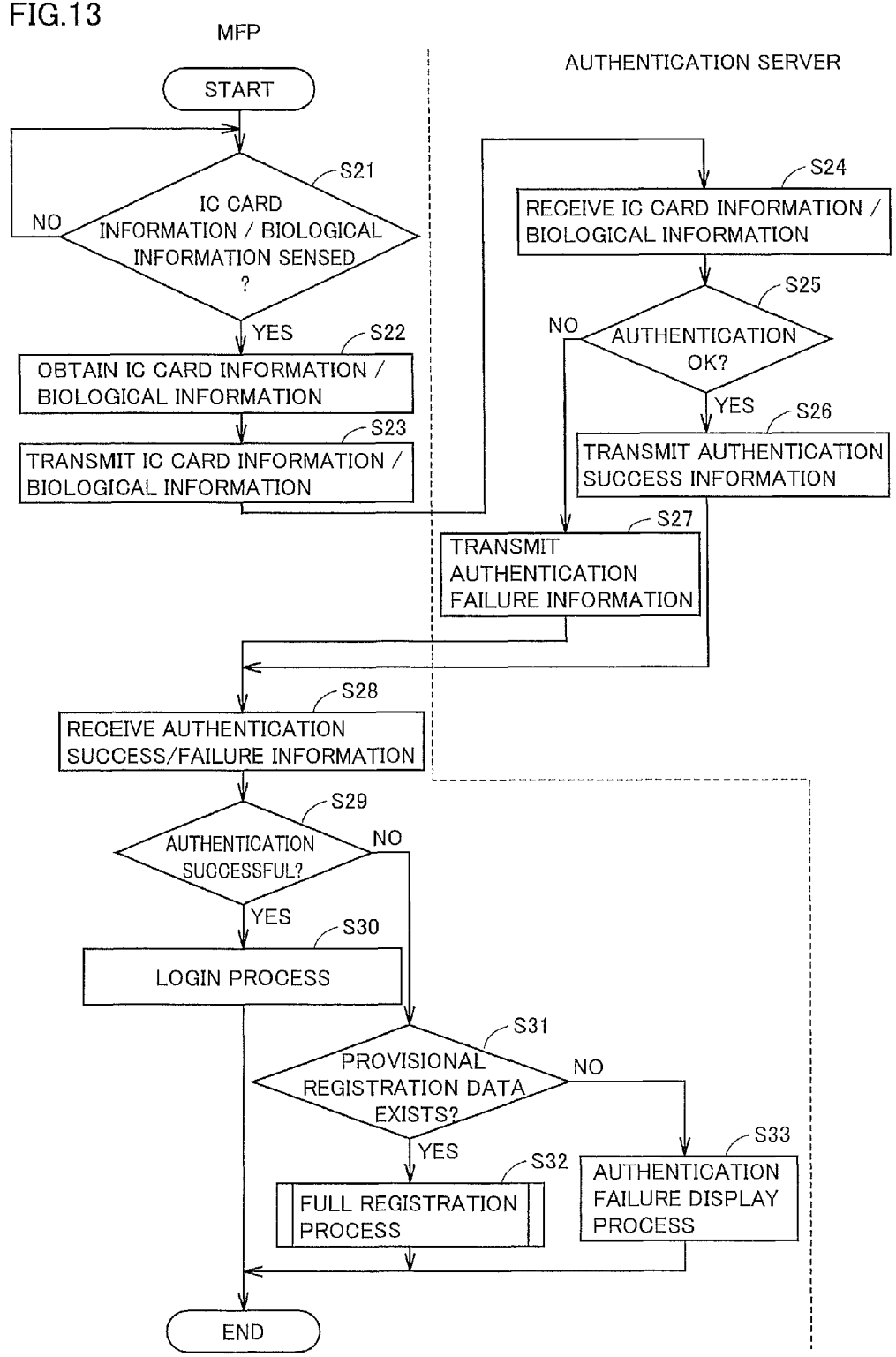

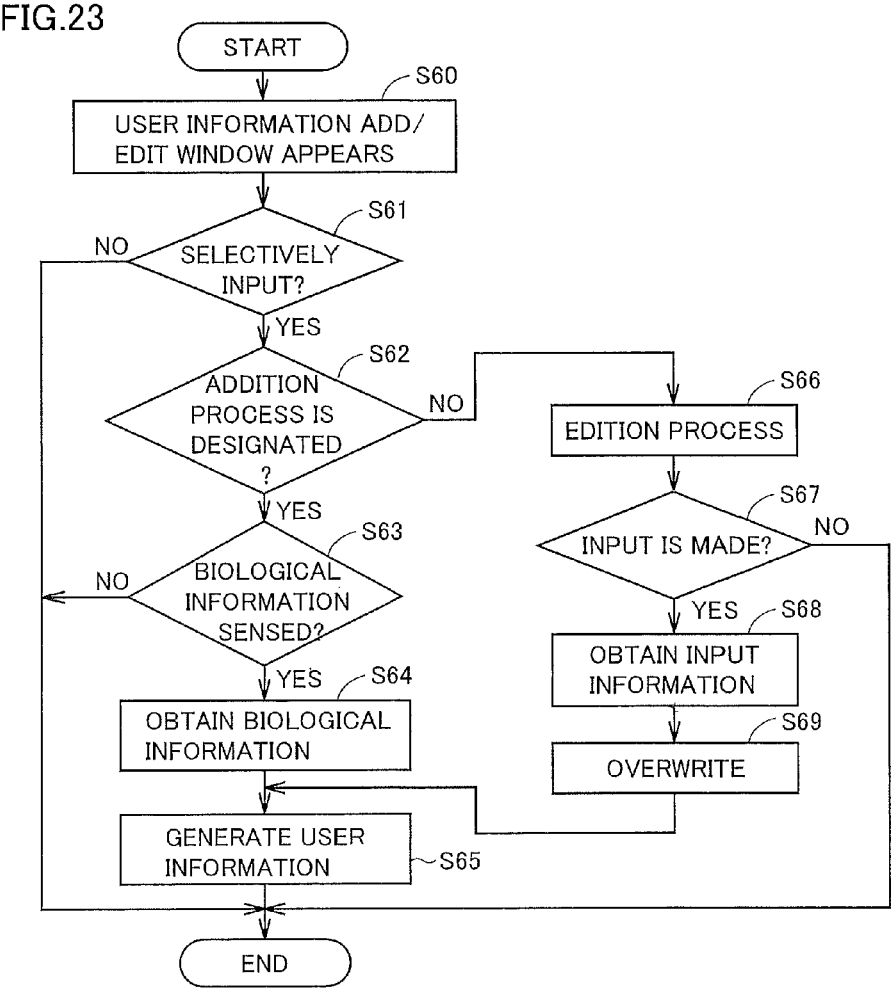

FIG.24
| USER INFORMATION ADD/EDIT WINDOW | | | | | |
|---|---|---|---|---|---|
| PLEASE SELECT THE ITEM YOU WANT TO ADD/EDIT. | | | | | |
| USER ID | PASSWORD | CARD ID | BIOLOGICAL INFORMATION#1 | BIOLOGICAL INFORMATION#2 | BIOLOGICAL INFORMATION#3 |
| USER_A | 1234 | 129838764523 | | | |
Cancel
FIG.25
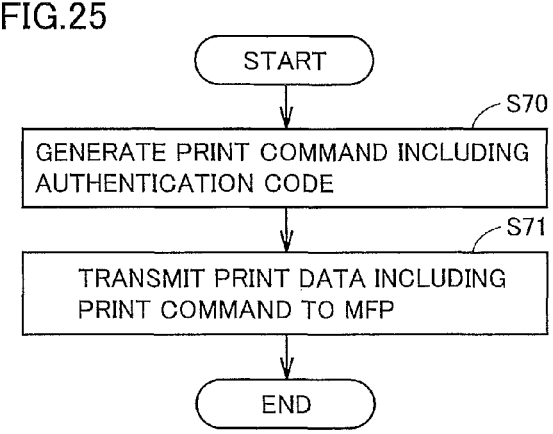
FIG.26
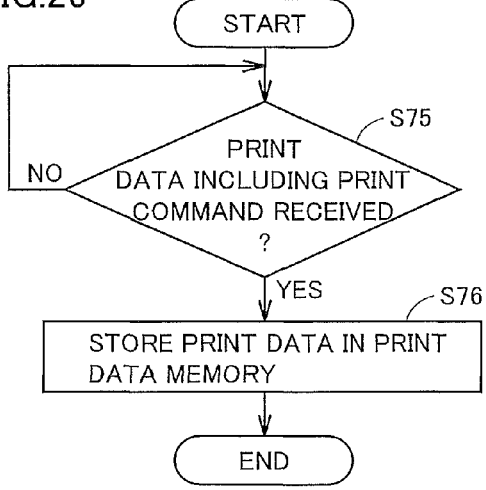

AUTHENTICATION APPARATUS, AUTHENTICATION SYSTEM, AUTHENTICATION METHOD, AND RECORDING MEDIUM HAVING AUTHENTICATION PROGRAM RECORDED THEREON

This application is based on Japanese Patent Application No. 2008-195188 filed with the Japan Patent Office on Jul. 29, 2008, the entire content of which is hereby incorporated by reference.

BACKGROUND OF THE INVENTION

1. Field of the Invention

The present invention relates to a user authentication process using an IC (Integrated Circuit) card having user authentication information stored therein or biological information in an authentication apparatus.

2. Description of the Related Art

Conventionally, a user authentication process is generally performed in terms of security, for example, in information processing apparatuses such as printers or MFP (Multi Function Peripheral).

For example, an information processing apparatus is connected with an external authentication server via a network. The user authentication process is executed based on whether user information registered in the external authentication server matches user information input in the information processing apparatus.

There are a variety of schemes in the user authentication process. In a scheme proposed in Japanese Laid-Open Patent Publication No. 2002-064483, in order to alleviate the burden on the user in the user authentication process, the user is requested to enter a password at the time of user registration but is not requested to enter a password when using services later.

In another scheme, for example, in order to improve the user's operability, an authentication process is executed by transmitting to an external authentication server identification data that is IC card information (for example, card identification numbers) or biological information.

However, when the user authentication process is executed using IC card information or biological information, the administrator has to manage IC card information (card identification number) or biological information and user information (user ID, password, and the like) to register them in an external authentication server. Therefore, unfortunately, the operational burden on the administrator is heavy, and the procedure is complicated.

Moreover, for example, when the user authentication process is performed using IC card information, it is necessary to distribute a collectively managed IC card to the corresponding user using an information processing apparatus.

SUMMARY OF THE INVENTION

The present invention is made to solve the aforementioned problems. An object of the present invention is to provide an authentication apparatus, an authentication system, an authentication method, an authentication program, and a recording medium, for executing a registration procedure necessary to execute a user authentication process with a simple scheme thereby executing a convenient user authentication process, in the case where a user authentication process is executed using IC card information or biological information.

An authentication apparatus in accordance with the present invention includes: a memory for storing an authentication code input at a user terminal and received; a reading device for reading identification data that is card identification information of an IC card or biological information; a controller for controlling an authentication apparatus. The controller transmits user information in which the identification data read by the reading device and the authentication code stored in the memory are associated with each other for registration in an authentication server; and executes a user authentication process with the authentication server, based on the user information registered in the authentication server.

An authentication system in accordance with the present invention includes: an information processing apparatus for executing a prescribed function; an authentication server connected to the information processing apparatus through a network to be used to execute a user authentication process for using the information processing apparatus; and a user terminal connected through the network for transmitting an authentication code. The information processing apparatus includes a reading device for reading identification data that is card identification information of an IC card or biological information, and a transmission portion for transmitting the identification data read by the reading device. The authentication server includes a reception portion for receiving the authentication code transmitted from the user terminal and the identification data transmitted from the transmission portion, and a controller for registering the identification data as user information in association with the authentication code received in the reception portion for executing the user authentication process.

Another authentication system in accordance with the present invention includes first and second information processing apparatuses for executing a prescribed function. The first information processing apparatus includes a memory for storing an authentication code input at a user terminal and received, a reading/writing device for reading an IC card having card identification information recorded thereon or for writing data therein, and a first controller for generating user information in which the card identification information read by the reading/writing device and the authentication code stored in the memory are associated with each other. The reading/writing device writes the user information generated by the first controller in the IC card. The second information processing apparatus includes a reading device for reading the IC card, and a second controller for determining whether the reading device has read the generated user information written in the IC card or not, and registering, when the reading device has read the generated user information, the read user information for executing a user authentication process.

An authentication method in accordance with the present invention includes the steps of: receiving an authentication code input at a user terminal; reading identification data that is card identification information of an IC card or biological information; transmitting user information in which the identification data read by the reading step and the authentication code received at the receiving step are associated with each other for registration in an authentication server; and executing a user authentication process with the authentication server, based on the user information registered in the authentication server.

A recording medium in accordance with the present invention has an authentication program recorded thereon for causing a computer to execute processing including the steps of: receiving an authentication code input at a user terminal; reading identification data that is card identification information of an IC card or biological information; transmitting user information in which the identification data read by the reading step and the authentication code received at the receiving step are associated with each other for registration in an authentication server; and executing a user authentication process with the authentication server, based on the user information registered in the authentication server.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a flowchart illustrating the user provisional registration process in MFP.

FIG. 12 is an illustration of provisional registration data in a case where an authentication code is provisionally registered in a user information database.

FIG. 13 is a flowchart illustrating the user authentication process in MFP in accordance with the first embodiment of the present invention.

FIG. 22 is an illustration of a user information confirmation window in accordance with the third modification of the first embodiment of the present invention.

FIG. 23 is a flowchart for executing a user information addition/edition process.

FIG. 24 is an illustration of a user information addition/edition window.

FIG. 25 is a flowchart illustrating a process of transmitting print data from a client PC.

FIG. 26 is a flowchart illustrating a process in a case where print data including a print command is received at MFP.

DESCRIPTION OF THE PREFERRED EMBODIMENTS

Figure 1:
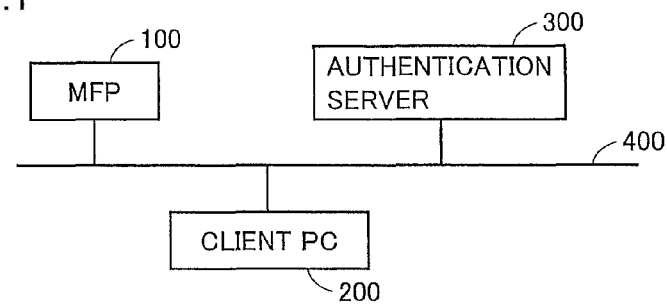
FIG. 1 is a schematic diagram illustrating an authentication system in accordance with a first embodiment of the present invention.

In the following, the embodiments of the present invention will be described with reference to the figures. In the following description, the same parts and components are denoted with the same reference numerals. They have the same designations and functions.

First Embodiment

Using FIG. 1, an authentication system in accordance with a first embodiment of the present invention will be described.

Referring to FIG. 1, the authentication system in accordance with the first embodiment of the present invention includes an MFP (Multi Function Peripheral) 100 which is a kind of authentication apparatus authenticating identification data of IC card information or biological information, a client PC 200, and an authentication server 300.

MFP 100, client PC 200, and authentication server 300 are connected via a network 400 so that they can communication with each other.

Network 400 includes Ethernet, a token-ring, a LAN (Local Area Network) having computers and network equipment mutually connected by a standard such as FDDI (Fiber Distributed Data Interface), a WAN (Wide Area Network) connecting LANs through a dedicated line, the Internet, and the like. It is noted the kind and number of devices connected to network 400 is not limited thereto.

Authentication server 300 is a server computer connected through network 400 to execute a user authentication process as described later.

Client PC 200 is a computer for use by users and can access MFP 100 in the configuration in accordance with the first embodiment of the present invention.

Using FIG. 2, a configuration of MFP 100 in accordance with the first embodiment of the present invention will be described.

Figure 2:
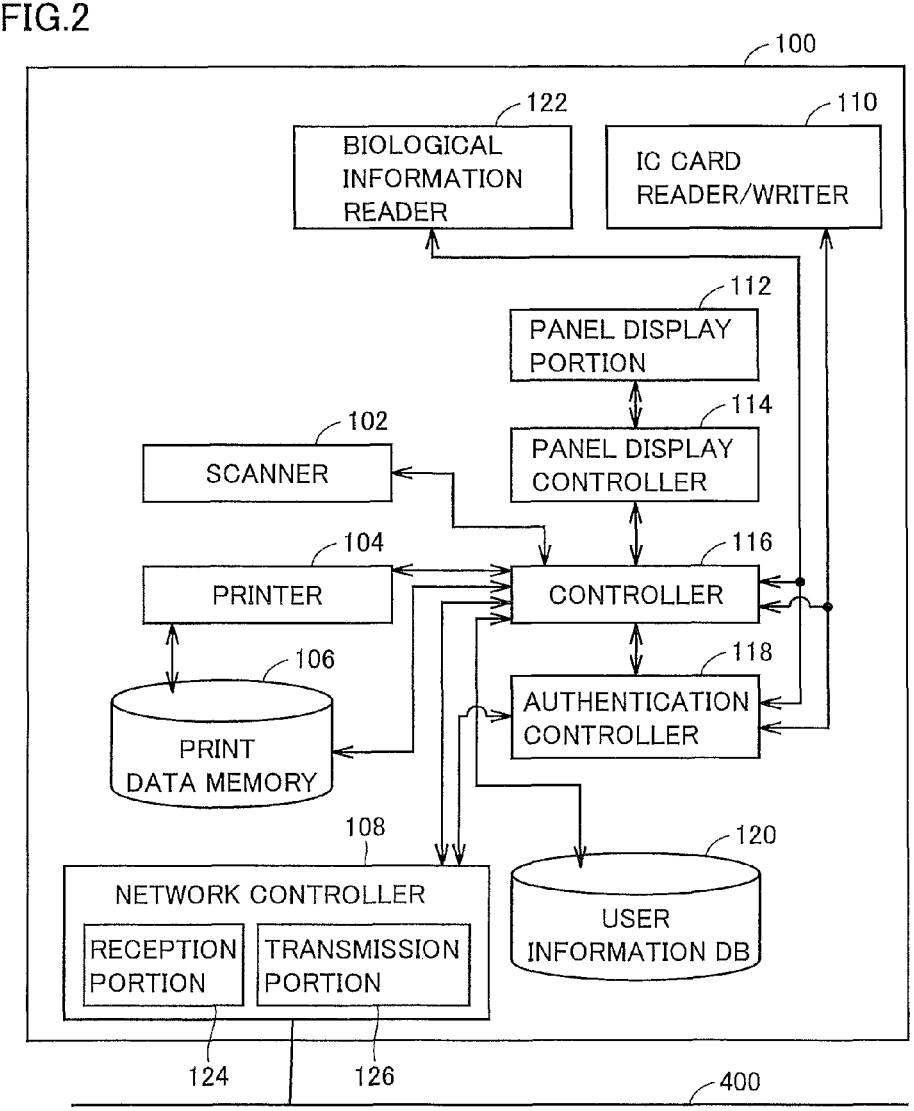
FIG. 2 is a schematic block diagram illustrating a configuration of MFP in accordance with the first embodiment of the present invention.

Referring to FIG. 2, MFP 100 in accordance with the first embodiment of the present invention includes a controller 116 for controlling the entire MFP 100, a user information database (DB) 120 for storing provisional registration data of users as described later, a print data memory 106 for storing print data transmitted from an external terminal device, for example, client PC 200 connected via the network, a printer 104 for executing a printing process on print data stored in print data memory 106, a scanner 102 for scanning image data of original documents etc., a panel display portion 112 including an operation panel, a panel display controller 114 controlling display on panel display portion 112, a network controller 108 for connecting to external network 400, an authentication controller 118 for executing the user authentication process with the external authentication server 300, a biological information reader 122 reading biological information, and an IC card reader/writer 110 capable of reading IC card information and writing data in IC cards. It is noted that in this example, the IC card reader may only have the function of reading IC card information.

Controller 116 is a CPU (Central Processing Unit) to execute control on the above-noted portions, a variety of operation processing, and the like, in accordance with a program stored in a not-shown memory.

Scanner 102 includes a light-receiving element such as CCD (Charge Coupled Device) for applying light from a light source to an original document for photoelectric conversion of the reflected light and an automatic document feeder for transferring original documents to a prescribed scanning position, and obtains image data of original documents from the light-receiving element such as CCD.

Network controller 108 includes a reception portion 124 for receiving print data transmitted from the external terminal device, for example, client PC 200 and a transmission portion 126 for transmitting data to the external terminal device, for example, client PC 200.

Authentication controller 118 is connected to biological information reader 122 and IC card reader/writer 110 to receive biological information read by biological information reader 122 or IC card information read by IC card reader/writer 110 and execute the user authentication process with the external authentication server 300.

Biological information reader 122 reads biological information, for example, fingerprint information in this example, to output the same as biological information to authentication controller 118 and controller 116.

IC card reader/writer 110 reads IC card information (for example, card identification number) stored in an IC card to output the same to authentication controller 118 and controller 116.

Using FIG. 3, a configuration of operation panel 10 in MFP 100 in accordance with the embodiment of the present invention will be described.

It is noted that operation panel 10 is included in panel display portion 112 in FIG. 2.

Figure 3:
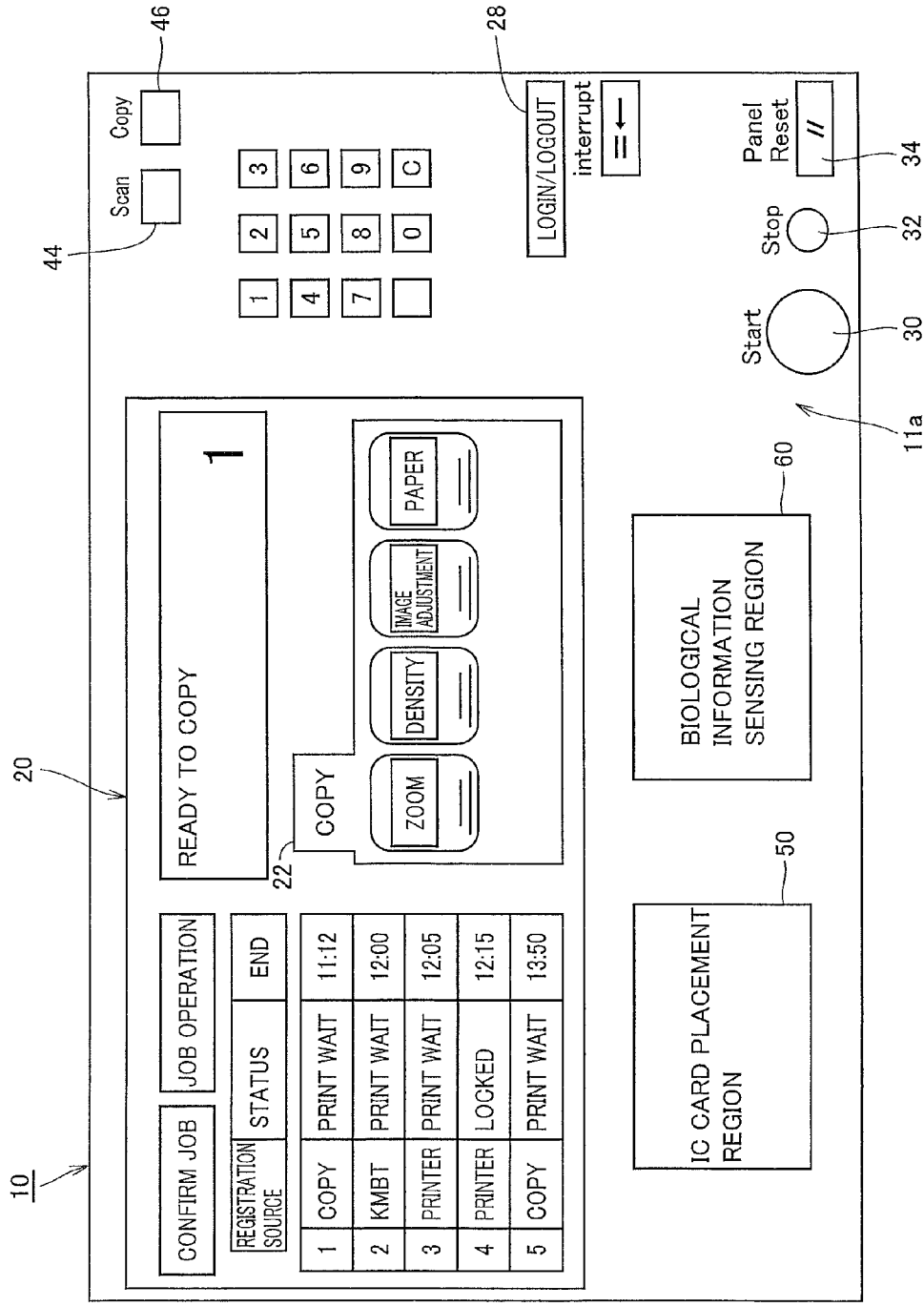
FIG. 3 is an illustration of a configuration of an operation panel in MFP in accordance with the embodiments of the present invention.

Referring to FIG. 3, a Start key 30 is used to start operations such as copy/scan. A ten-key pad is used to input numeric values and the like such as the number of copies. A Clear key is used to clear the input numeric values and discard the accumulated stored image data.

A Stop key 32 is used to give an instruction to stop the copy/scan operation. A Panel Reset key 34 is used to discard the set mode and job.

In addition, operation display 20 is provided with a touch panel for executing display and setting of a variety of modes.

This touch panel allows the user to make a variety of settings in accordance with the display contents in operation display 20.

Furthermore, in a setting window region using the touch panel, buttons are usually arranged for basic/advanced settings performed in executing a copy operation or a scan operation. When each button is pressed, a layered window appears for performing the detailed settings.

In this example, detail setting region 22 for executing a copy operation is shown, and an icon for adjusting magnifications, an icon for image adjustment, and an icon for setting paper are shown in this region, by way of example.

Although the icons for setting details in the case of a copy operation are illustrated in this example, a similar detail setting region is also displayed for a scan operation.

Furthermore, job information applied to MFP 100 at that moment is displayed in the job information window region on the left. The display is arranged in the order of jobs to be executed. When an operation such as deletion/change is performed on a particular job, the job operation button is selected and the job number button for the operation target is thereafter pressed. These operations allow a job operation window to appear, enabling an operation on the particular job.

A Copy key 46 and a Scan key 44 are select keys for setting in which of the copy mode and the scanner mode MFP 100 is to be operated.

When Copy key 46 is pressed, MFP 100 becomes available as a copier. In this state, a scanner operation cannot be executed.

On the other hand, when Scan key 44 is pressed, MFP 100 serves as a scanner. In this state, a copy operation cannot be performed.

It is noted that Copy key 46 and Scan key 44 cause exclusive operations. When one of them is selected, the other is automatically not selected.

Furthermore, operation panel 10 is provided with an IC card placement region 50. A user who wishes to use MFP 100 places his carrying IC card at this region, so that IC card information is read by IC card reader/writer 110 and output to authentication controller 118.

Here, the present invention is applicable to either contact-type or noncontact-type IC cards.

In addition, operation panel 10 is provided with a biological information sensing region 60. A user who wishes to use MFP 100 places his own finger at this region, so that fingerprint information as biological information is read by biological information reader 122 and output to authentication controller 118.

It is noted that although in this example, fingerprint information is illustrated as an example of biological information, the present invention is not limited to fingerprint information and any other information may be used. For example, hand information using the width of a palm or the length of a finger or retina information using a capillary pattern of the eye retina may be used. Any other identification information such as voice information using a voice print or handwriting information using handwriting habits including trace, speed and pressure changes in writing may be used as long as it is distinguishable from those of other persons.

In addition, operation panel 10 is provided with a login/logout button 28. For example, when the user does not carry his IC card, the user can press this button to enter IC card information or the like for executing a user authentication process.

Using FIG. 4, a configuration of authentication server 300 in accordance with the first embodiment of the present invention will be described schematically.

Figure 4:
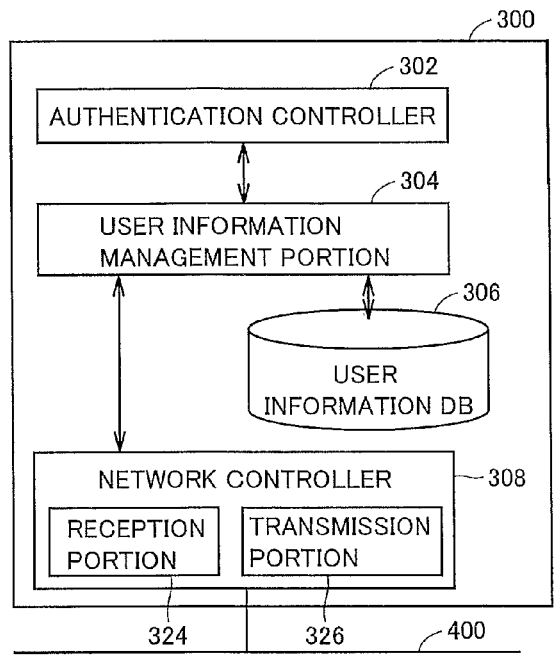
FIG. 4 is a block diagram schematically illustrating a configuration of an authentication server in accordance with the first embodiment of the present invention.

Referring to FIG. 4, authentication server 300 in accordance with the first embodiment of the present invention includes a network controller 308 connected to network 400 for controlling data reception and transmission, a user information database (DB) 306 for storing user information used for executing the user authentication process, an authentication controller 302 for executing the user authentication process, and a user information management portion 304 connected to each portion for managing user information.

Network controller 308 includes a reception portion 324 for receiving data and a transmission portion 326 for transmitting data.

User information management portion 304 outputs to authentication controller 302 data received at reception portion 324 from user information DB 306 and also obtains data required for the user authentication process from user information DB 306 for output to authentication controller 302.

Authentication controller 302 outputs an authentication result to user information management portion 304. User information management portion 304 then sends the authentication result to a prescribed destination through transmission portion 326 and network 400. In this example, the authentication result is sent to MFP 100.

Using FIG. 5, a configuration of client PC 200 in accordance with the first embodiment of the present invention will be described schematically.

Figure 5:
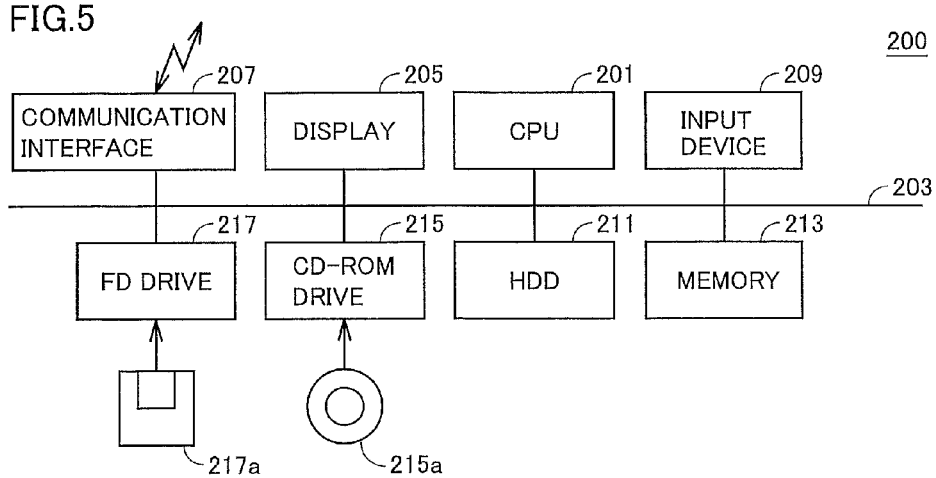
FIG. 5 is a block diagram schematically illustrating a configuration of a client PC in accordance with the first embodiment of the present invention.

Referring to FIG. 5, client PC 200 in accordance with the embodiment of the present invention includes a CPU 201 executing a variety of programs including an operating system (OS), a memory 213 temporarily storing data necessary to execute the program portion of CPU 201, and an HDD (Hard Disk Drive) 211 storing the program executed in CPU 201 in a non-volatile manner.

HDD 211 also stores a printer driver which is a software program for transmitting print data to MFP 100 of the present invention. The printer driver is read by CPU 201 to implement the functions described later.

Such a program is read by a FD (Floppy Disc) drive 217 or a CD-ROM (Compact Disc-Read Only Memory) drive 215 from a flexible disk 217a or a CD-ROM 215a, respectively.

CPU 201 receives an instruction from the user through an input device 209 including a keyboard, a mouse, etc. and outputs to a display portion 205 an image output generated by execution of a program.

CPU 201 also transmits print data to MFP 100 connected to LAN or Wan through a communication interface 207 formed of a LAN card or the like. The portions above communicate data with each other through an internal bus 203.

Using FIG. 6, a functional block of a printer driver in accordance with the first embodiment of the present invention will be described.

Figure 6:
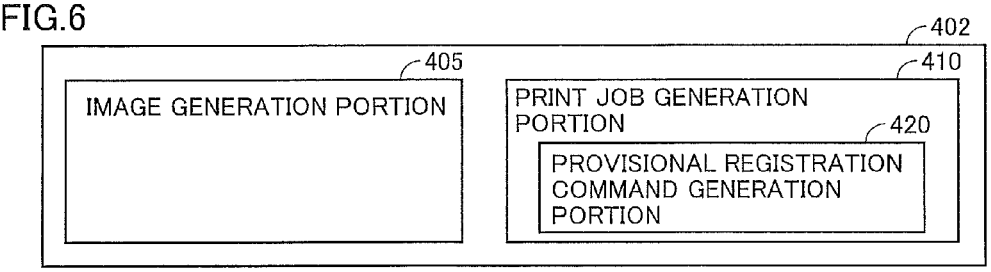
FIG. 6 is an illustration of a functional block of a printer driver in accordance with the first embodiment of the present invention.

Referring to FIG. 6, a printer driver 402 in accordance with the first embodiment of the present invention can be read by CPU 201 to implement mainly two functions.

Specifically, the functions include an image generation portion 405 for generating image data included in print data and a print job generation portion 410 generating as print job data control data etc. for executing a variety of printing settings for the image data generated by image generation portion 405.

Print job generation portion 410 includes a provisional registration command generation portion 420 generating a provisional registration command issued for executing the user authentication process in accordance with the embodiment of the present invention.

The provisional registration command generated in provisional registration command generation portion 420 is stored as print job data.

CPU 201 transmits the print data including the print job data to MFP 100 through communication interface 207.

Using FIG. 7, a print setting window appearing on display portion 205 of client PC 200 based on the function of print job generation portion 410 in accordance with the first embodiment of the present invention will be described.

Figure 7:
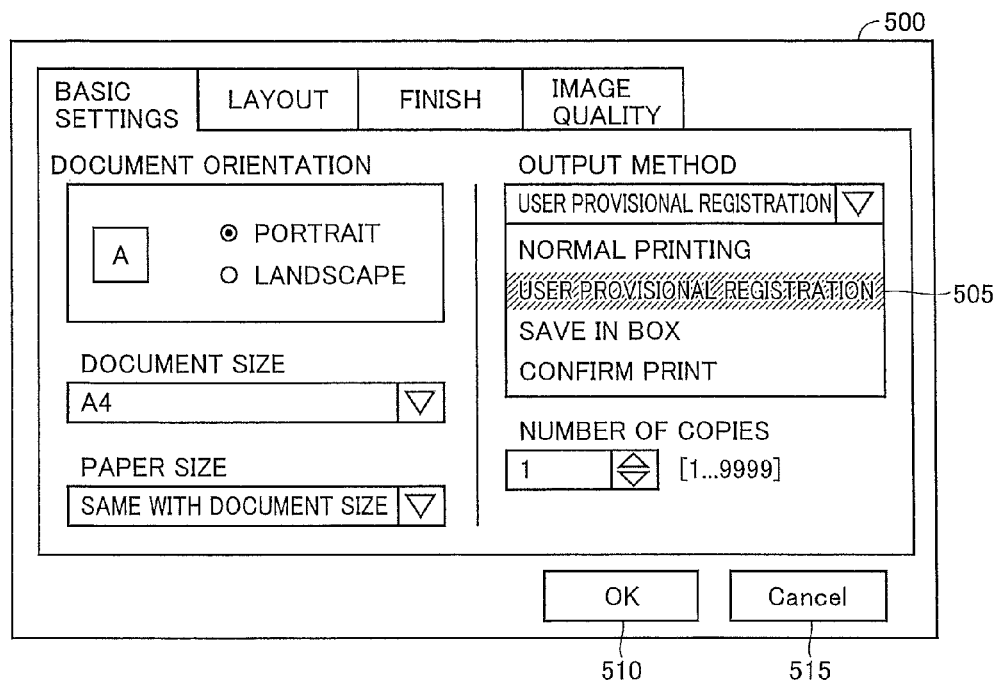
FIG. 7 is an illustration of a print setting window appearing on a display portion of the client PC based on a function of a print job generation portion in accordance with the first embodiment of the present invention.

Referring to FIG. 7, in a print setting window 500 in accordance with the first embodiment of the present invention, a "basic setting window" is shown here by way of example. The user can set, for example, "orientation of document," "document size," "paper size," "output method," "number of copies," etc. using a not-shown pointing device etc. such as a mouse included in input device 209.

Here, as the settings of "output method," "normal print," "user provisional registration," "save in box," "confirm print" can be selected. In this example, a cursor 505 is placed on "user provisional registration" as the output method.

In the state where cursor 505 is placed on "user provisional registration," an "OK" button 510 is pressed to display a setting window for executing a user provisional registration process.

It is noted that a "Cancel" button 515 may be pressed to close print setting window 500.

Using FIG. 8, a user provisional registration process in accordance with the first embodiment of the present invention will be described.

Figure 8:
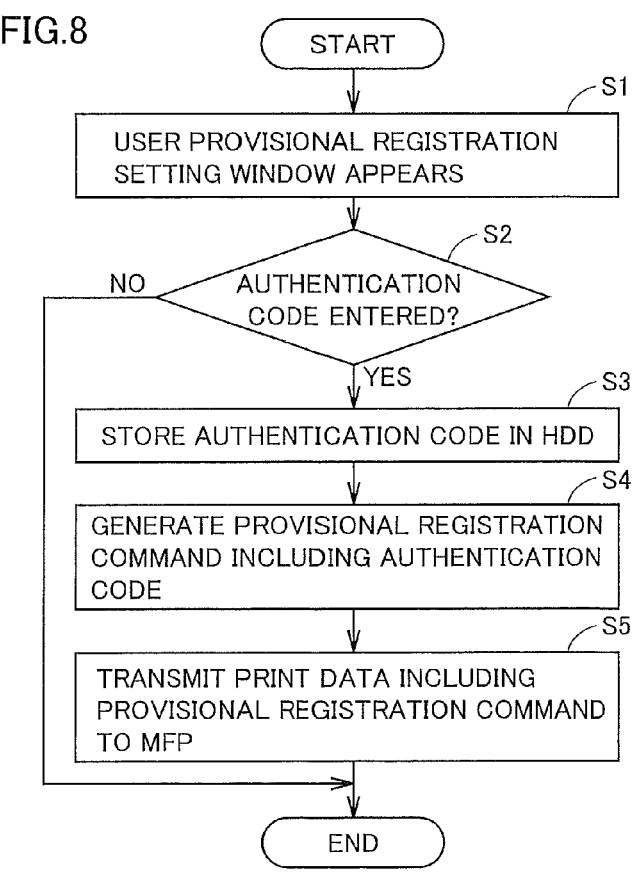
FIG. 8 is a flowchart illustrating a user provisional registration process in accordance with the first embodiment of the present invention.

Referring to FIG. 8, first, the user provisional registration setting window appears (step S1). Specifically, in print setting window 500 described above, cursor 505 is placed on "user provisional registration" and "OK" button 510 is pressed. The user provisional registration setting window thus appears.

Using FIG. 9, a user provisional registration setting window 520 will be described.

Figures 9, 10:
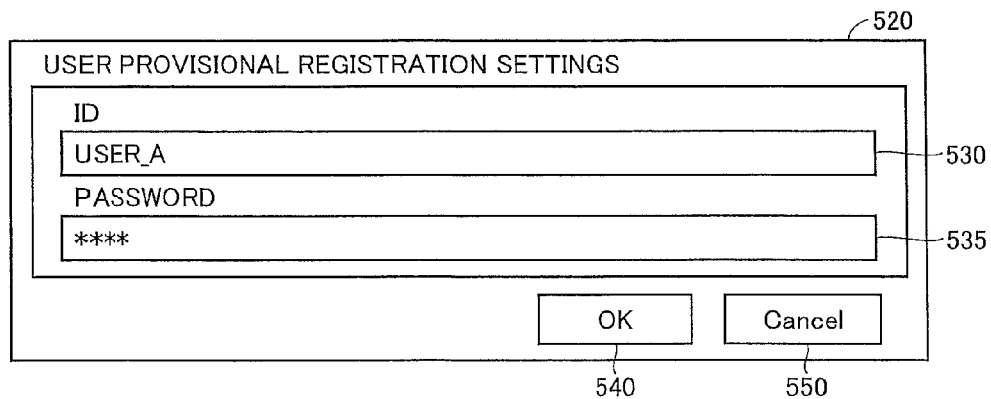
FIG. 9 is an illustration of a user provisional registration setting window.
FIG. 10 is an illustration of print job data in accordance with the first embodiment of the present invention.

Referring to FIG. 9, in user provisional registration setting window 520 in accordance with the first embodiment of the present invention, a window for entering an authentication code when the user provisional registration process is executed is shown.

Specifically, entry fields 530 and 535 are provided in which a user ID (identification) and a password are entered, respectively.

The user can enter his ID and password in entry fields 530 and 535 arbitrarily using input device 209 including a keyboard, a mouse, etc.

In this example, "USER_A" is input as a user ID and "1234" is input as a password, by way of example. Symbols "*" are displayed as characters to be displayed in entry field 535 for passwords for enhancing the confidentiality.

Referring to FIG. 8 again, after the user provisional registration setting window appears, it is determined whether an authentication code has been entered or not (step S2). Specifically, it is determined whether or not the user ID and the password are entered in entry fields 530 and 535, respectively, and an "OK" button 540 is pressed in user provisional registration setting window 520.

On the other hand, if a "Cancel" button 550 is pressed in user provisional registration setting window 520, the process ends (END) and print setting window 500 then appears.

In step S2, if an authentication code has been entered, then the authentication code is stored in HDD 211 (step S3).

Then, a provisional registration command including the authentication code is generated (step S4).

Specifically, provisional registration command generation portion 420 generates a provisional registration command including the input authentication code, Then, print data including the provisional registration command is transmitted to MFP 100 (step S5). The process then ends (END).

Specifically, print job generation portion 410 generates print job data having the provisional registration command generated in provisional registration command generation portion 420. Then, printer driver 402 generates print data including the print job data, which is transmitted through communication interface 207.

Using FIG. 10, print job data in accordance with the first embodiment of the present invention will be described.

Referring to FIG. 10, a variety of necessary data is shown here as file data in the so-called PJL (Printer Job Language) format, by way of example.

Specifically, print job data shown here includes an authentication code described by commands in the PJL format as control data for executing a variety of print settings on image data.

In this example, provisional registration commands for executing the user provisional registration process are described as print job data, by way of example. Specifically, an instruction command "SelfRegist"="ON" is described. In addition, "SelfRegistUser"="USER_A" and "SelfRegistPass"="1234" are described as authentication codes corresponding to the provisional registration data of the user provisional registration process.

The instruction command "SelfRegist"="ON" is set to execute the user provisional registration process of registering as provisional registration data the authentication code included in the print data received in MFP 100.

In the case of transmission of the print data, image data is not generated in image generation portion 405 and image data is not included in the print data.

In this example, based on the presence/absence of the instruction command "SelfRegist"="ON," the user provisional registration process of registering the authentication code as provisional registration data is executed. However, the user provisional registration process may be executed, for example, based on that image data is not included in the print data.

Using FIG. 11, the user provisional registration process in MFP 100 will be described.

Referring to FIG. 11, controller 116 determines whether print data including a provisional registration command is received or not in reception portion 124 of network controller 108 (step S10).

If print data including a provisional registration command is received in step S10, then an authentication code is obtained (step S11). Specifically, if the print data includes a provisional registration command, controller 116 obtains the authentication code included in the provisional registration command.

Then, controller 116 inquires of authentication server 300 about the user ID of the authentication code (step S12). Specifically, controller 116 transmits the user ID included in the obtained authentication code to authentication server 300 through transmission portion 126 of network controller 108.

Then, it is determined whether the same user ID is absent or not in authentication server 300 (step S13). Specifically, the user ID is sent to authentication server 300. User information management portion 304 of authentication server 300 refers to user information DB 306 to determine whether the user information having the same user ID is registered or not, and outputs the determination result.

If controller 116 determines that the same user ID is absent, based on the determination result from authentication server 300 in step S13, controller 116 then stores the authentication code in user information DB 120 (step S14). Specifically, the authentication code is stored in user information DB 120 as provisional registration data. The user provisional registration process then ends (END).

On the other hand, if controller 116 obtains a determination result that the same user ID is present in authentication server 300 in step S13, controller 116 executes an error notification process for client PC 200 through transmission portion 126 of network controller 108 (step S15). The process then ends (END).

In this process, if MFP 100 receives print data including the provisional registration command, MFP 100 inquires of authentication server 300 whether the same user ID with the authentication code included in the provisional registration command is present or not. If the same user ID is absent, the authentication code including the user ID is registered as provisional registration data in user information database 120 of MFP 100. On the other hand, if the same user ID is present in authentication server 300, the error notification process is executed for client PC 200, whereby a transmission error shows up on display portion 205 of client PC 200 to indicate that the user provisional registration process is failed.

If it is recognized in client PC 200 that the user cannot successfully execute the user provisional registration process for the input authentication code, according to the error notification process from MFP 100, the user provisional registration process according to another authentication code is executed again, so that provisional registration data for a user ID different from the user ID stored in authentication server 300 can be stored in user information database (DB) 120.

Using FIG. 12, provisional registration data in the case where the authentication code is provisionally registered in the user information database will be described.

Referring to FIG. 12, here, it is supposed that a user ID and a password are stored as an authentication code by receiving print data including the provisional registration command.

Specifically, "USER_A" is stored as a user ID and "1234" is stored as a password.

Using FIG. 13, the user authentication process in MFP 100 in accordance with the first embodiment will be described.

Referring to FIG. 13, first, on the MFP 100 side, it is determined whether IC card information or biological information is sensed or not (step S21). Specifically, it is determined in the aforementioned IC card placement region 50 or biological information sensing region 60 whether an IC card is sensed or not by IC card reader/writer 110 or whether biological information is sensed or not by biological information reader 122.

If an IC card is sensed or biological information is sensed by biological information reader 122 in step S21, then the IC card information or the sensed biological information is obtained (step S22). Specifically, authentication controller 118 obtains the IC card information or the biological information output from IC card reader/writer 110 or biological information reader 122.

Then, the IC card information or the biological information is sent to authentication server 300 (step S23). Specifically, authentication controller 118 sends the IC card information or the biological information to authentication server 300 through transmission portion 126 of network controller 108.

On the authentication server 300 side, the IC card information or the biological information sent by MFP 100 is received (step S24).

Then, it is determined whether the authentication is OK or not (step S25).

Specifically, user information management portion 304 of authentication server 300 outputs the IC card information or biological information received through reception portion 324 to authentication controller 302. User information management portion 304 also outputs the user information stored in user information database 306 to authentication controller 302. Then, the authentication process is executed in authentication controller 302 to determine whether the user information corresponding to the received IC card information is registered or not in user information database 306. If the same IC card information is registered, it is determined that the authentication is OK. If the same IC card information is not registered, it is determined that the authentication is failed. Alternatively, the authentication process is executed in authentication controller 302 to determine whether the user information corresponding to the received biological information is registered or not in user information database 306. If the same biological information is registered, it is determined that the authentication is OK. If the same biological information is not registered, it is determined that the authentication is failed.

If the authentication is OK, that is, if the authentication is successful in step S25, authentication success information is transmitted (step S26). On the other hand, if authentication is failed in step S25, authentication failure information is transmitted (step S27). Specifically, authentication controller 302 outputs the authentication result to user information management portion 304, and user information management portion 304 in turn transmits authentication success information or authentication failure information, based on the authentication result, through transmission portion 326 of network controller 308. The user information stored in association with IC card information or biological information in user information DB 306 may be included in the authentication success information.

Then, on the MFP side, authentication success/failure information is received (step S28). Then, based on the received authentication success/failure information, it is determined whether the authentication is successful or not (step S29). Specifically, authentication controller 302 outputs the result to controller 116, based on the authentication success/failure information.

If the authentication is successful in step S29, a login process is executed (step S30). Specifically, controller 116 allows the user for whom the user authentication process has been completed to perform an access process, based on the authentication success result from authentication controller 118. For example, the job processing in scanner 102 or printer 104 is allowed.

When user information is included in the authentication success information, the information is stored in a not-shown memory.

On the other hand, if the authentication is failed in step S29, it is then determined whether provisional registration data exists or not (step S31). Specifically, controller 116 refers to user information DB 120 to determine whether provisional registration data exists or not, based on the authentication failure result from authentication controller 118.

If provisional registration data exists in user information DB 120 in step S31, the process proceeds to a full registration process (step S32).

On the other hand, if provisional registration data does not exist in step S31, a process of displaying that authentication failed is executed (step S33). The process then ends (END).

Using FIG. 14, a full registration process in accordance with the first embodiment of the present invention will be described.

Figure 14:
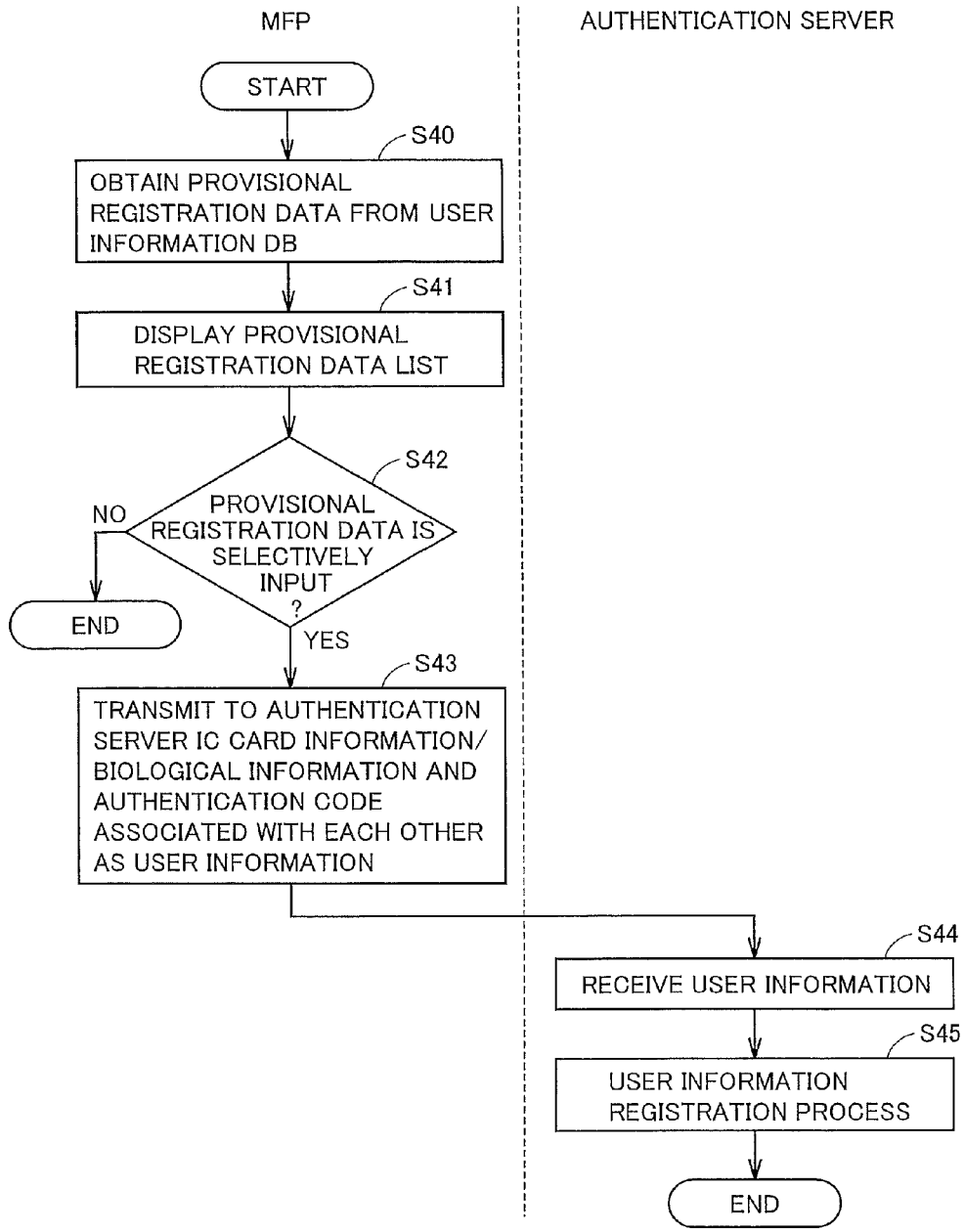
FIG. 14 is a flowchart illustrating a full registration process in accordance with the first embodiment of the present invention.

Referring to FIG. 14, first, controller 116 obtains provisional registration data from the user information database (DB) (step S40).

Then, controller 116 instructs panel display controller 114 to display a list of provisional registration data on panel display portion 112 (step S41). The same applies to the following display process.

Using FIG. 15, a provisional registration data list window in accordance with the first embodiment of the present invention will be described.

Figure 15:
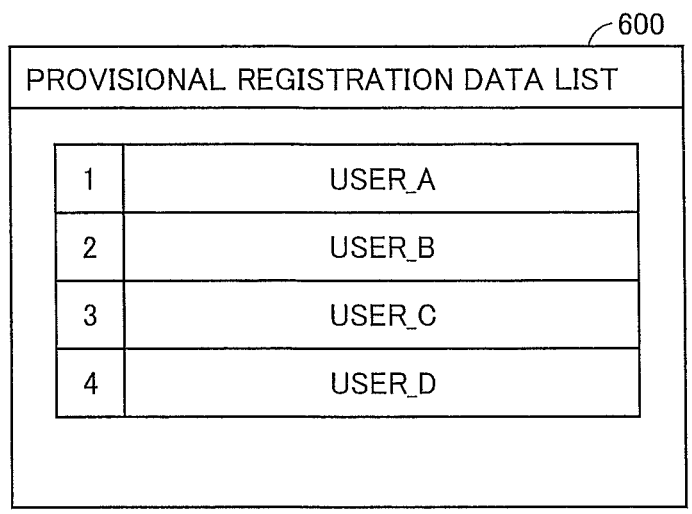
FIG. 15 is an illustration of a provisional registration data list window in accordance with the first embodiment of the present invention.

Referring to FIG. 15, here, in a provisional registration data list window 600, "USER_A," USER_B." USER_C," "USER_D" as different user provisional registration data are associated with the respective numbers in the displayed list.

Here, only user ID of the authentication code is displayed.

Referring to FIG. 14 again, next, in step S42, it is determined whether the provisional registration data is selectively input or not (step S42).

Specifically, if the provisional registration data is selectively input in provisional registration data list window 600 in step S42, controller 116 transmits to authentication server 300 user information in which IC card information or biological information is associated with the authentication code (step S43). Specifically, controller 116 transmits to authentication server 300 user information including IC card information or biological information and the authentication code.

Then, authentication server 300 receives the user information transmitted from MFP 100 (step S44).

Then, authentication server 300 executes a process of registering the received user information (step S45). The process then ends (END).

Specifically, user information management portion 304 of authentication server 300 registers the received user information in user information database (DB) 306.

Using FIG. 16, the user information registered in user information database (DB) 306 of authentication server 300 will be described.

Figure 16:
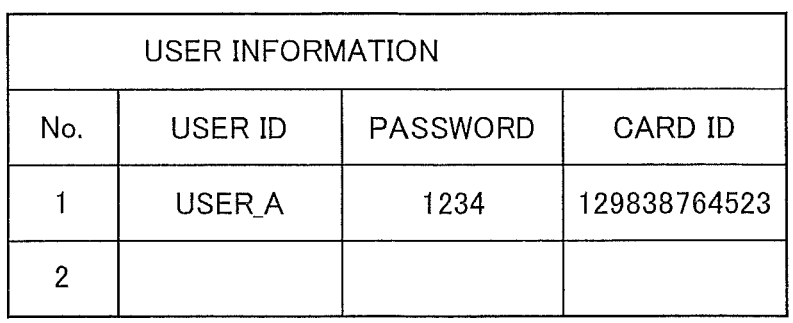
FIG. 16 is an illustration of user information registered in the user information database (DB) of the authentication server.

Referring to FIG. 16, here, "USER_A" as user ID and "1234" as a password as well as a card identification number "129838764523" as IC card information are stored in association with each other. The IC card information may be a combination of alphabets, symbols, etc. other than numerals.

The full registration process for executing a user authentication process can thus be executed in authentication server 300. Although the IC card information is associated here, biological information may be associated, similarly.

When the user uses, for example, an IC card to execute the user authentication process described with reference to FIG. 13 after execution of the full registration process in authentication server 300, authentication success is determined in authentication controller 118. The result is output to controller 116, and the login process is then executed.

More specifically, in the registration procedure in the user authentication process in accordance with the first embodiment of the present invention, the user provisional registration process is executed between client PC 200 and MFP 100, and the full registration process is executed between MFP 100 and authentication server 300, in this example.

Specifically, in the user provisional registration process, the user can input the user ID and password desired by himself in client PC 200 as the authentication code and transmits print data including the provisional registration command to MFP 100.

Then, in MFP 100, the authentication code included in the provisional registration command is stored as provisional registration data in user information DB 120.

Then, for example, the user carries his owned IC card and places it on IC card placement region 50, so that provisional registration data is displayed and selectively input. Accordingly, the user information in which IC card information is associated with the selected, provisionally registered authentication code is generated, and the full registration process is executed in authentication server 300.

Alternatively, the user places, for example, his index finger as fingerprint information at biological information sensing region 60, so that the provisional registration data is displayed and selectively input. Accordingly, the user information in which biological information is associated with the selected, provisionally registered authentication code is generated, and the full registration process is executed in authentication server 300.

More specifically, the user executes an operation to enter the authentication code once in client PC 200 in the user provisional registration process and then selectively inputs the provisional registration data provisionally registered in MFP 100, whereby the authentication code associated with IC card information (card identification number) or biological information is registered in authentication server 300.

The user can therefore freely input the user ID or password of the authentication code desired by himself at his client PC, thereby eliminating the need for an administrator who registers the authentication codes in authentication server 300, and increasing selections of authentication codes. In addition, the full registration process can be executed according to an operation of entering the authentication code in only one-time user provisional registration process, thereby eliminating the need for cumbersome procedures, and achieving a highly convenient user authentication process.

In the conventional example, the administrator has to distribute an IC card having user information etc. registered thereon. However, once the user executes the user provisional registration process at his client PC, the user can execute the full registration process using a raw IC card having no data other than IC card information stored therein, thereby eliminating the need for the administrator to distribute an IC card and achieving a convenient user authentication process.

Although a user ID and a password are included in an authentication code in this example, either one of them may be included.

First Modification of First Embodiment

Using FIG. 17, a full registration process in accordance with a first modification of the first embodiment of the present invention will be described, Referring to FIG. 17, the full registration process in accordance with the first modification of the first embodiment of the present invention differs from the flow of the full registration process in the first embodiment illustrated in FIG. 14 in that a password entry window appears after the provisional registration data is selectively input.

Specifically, after provisional registration data is selectively input in step S42, a password window appears (step S46).

Using FIG. 18, a password entry window 700 will be described.

Figure 18:
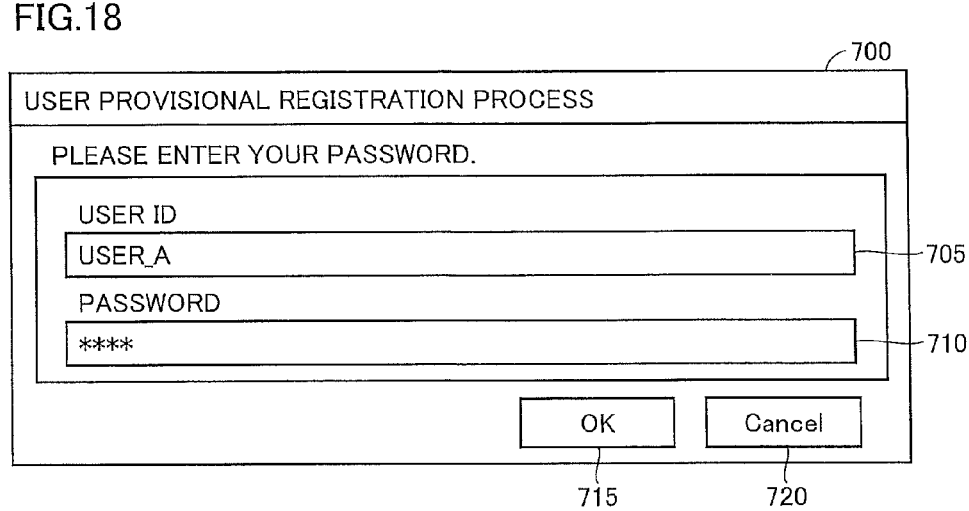
FIG. 18 is an illustration of a password entry window.

Referring to FIG. 18, in password entry window 700, here, "Please enter your password" is displayed together with entry fields 705 and 710. Specifically, entry field 705 allows the user to enter the user ID using the ten-key pad or the like, and entry field 710 allows the user to enter the password. In this example, since the user ID has been selected in the provisional registration data list window, the selected user ID is displayed in entry field 705. It is noted that the user ID displayed in entry field 705 may be changed to another ID.

Referring to FIG. 17 again, it is then determined whether an input is made or not after password entry window 700 is displayed in step S46 (step S47).

Specifically, in password entry window 700, controller 116 determines whether a password entry is made in entry field 710 and an "OK" button 715 is pressed or not. If a "Cancel" button 720 is pressed in password entry window 700 in FIG. 18, the process ends (END).

If it is determined that an input is made in step S47, then it is determined whether or not the password included in the authentication code matches the input password (step S48). Specifically, controller 116 determines whether or not the password included in the authentication code corresponding to the selected provisional registration data matches the input password.

If it is determined in step S48 that the password included in the authentication code matches the input password, controller 116 transmits to authentication server 300 user information in which IC card information or biological information and the authentication code are associated with each other (step S49).

On the other hand, if the password included in the authentication code does not match the input password in step S48, the password entry window in step S46 appears again.

The process after step S49 is similar to the one illustrated in the flowchart in FIG. 14, and the detailed description thereof will not be repeated.

According to the technique in accordance with the first modification of the first embodiment of the present invention, when provisional registration data is selected, the determination process is further added as to whether or not the password entered by the user in the password entry window matches the password included in the authentication code, thereby preventing an erroneous operation of the other persons conducting full registration of wrong provisional registration data when selectively inputting the provisional registration data, and allowing the user to conduct full registration of his desired provisional registration data.

Second Modification of First Embodiment

In the technique in accordance with the first modification of the first embodiment above, when the provisional registration data is selectively input, the determination process is executed as to whether or not the password entered by the user in the password entry window matches the password included in the authentication code. In a second modification of the first embodiment, when the provisional registration data is selectively input, a determination process as to whether or not a temporary password entered by the user matches a temporary password associated with the authentication code is executed.

In this example, in user provisional registration setting window 520 illustrated in FIG. 9, an entry field for entering a temporary password is additionally provided together with the entry fields for entering a user ID and a password. By associating the temporary password entered in the entry field for entering a temporary password with the authentication code of the entered user ID and password, a provisional registration command is generated and registered as provisional registration data in user information DB 120.

Using FIG. 19, the full registration process in accordance with the second modification of the first embodiment of the present invention will be described.

Figure 17:
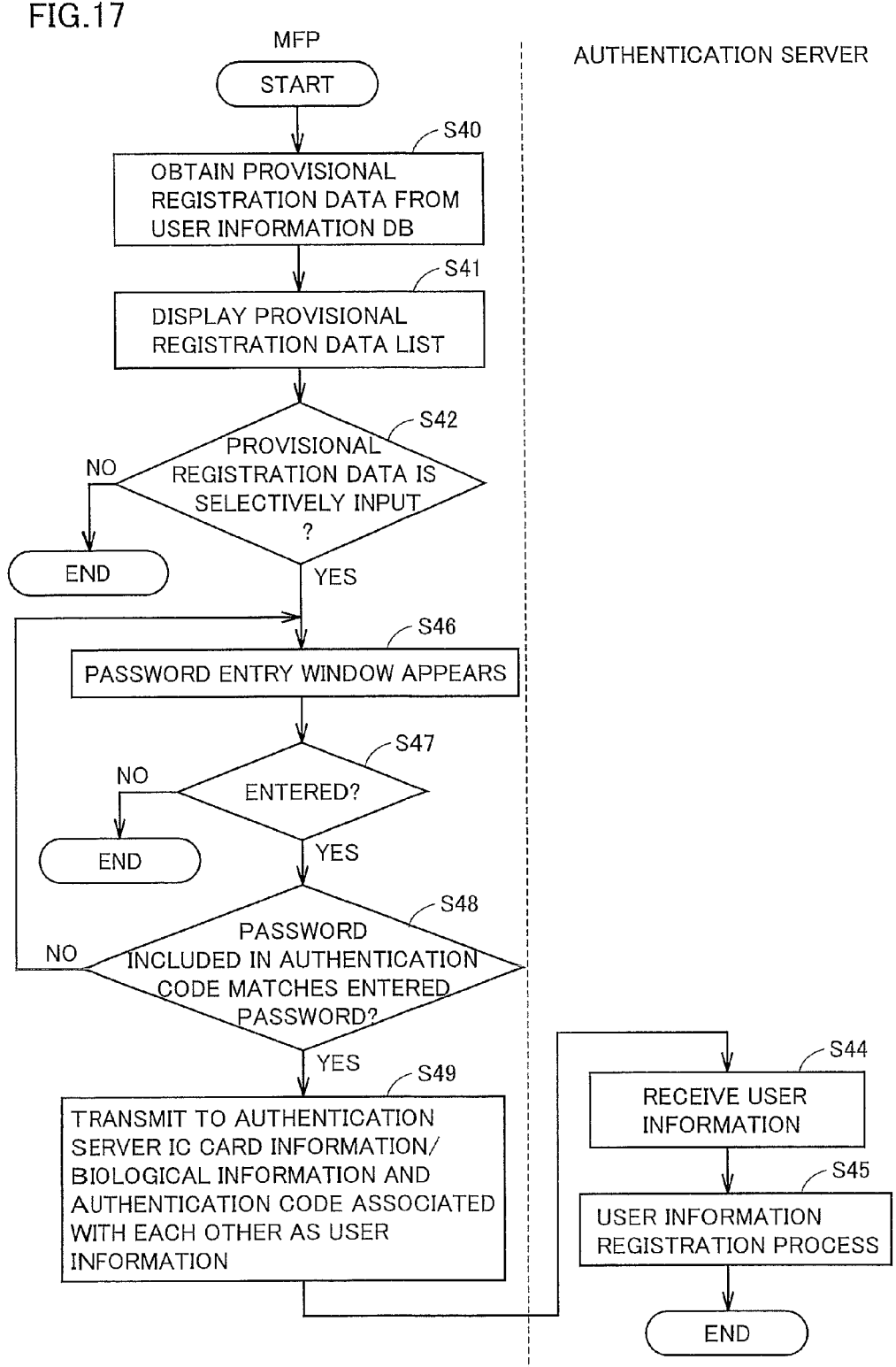
FIG. 17 is a flowchart illustrating the full registration process in accordance with a first modification of the first embodiment of the present invention.
Figure 19:
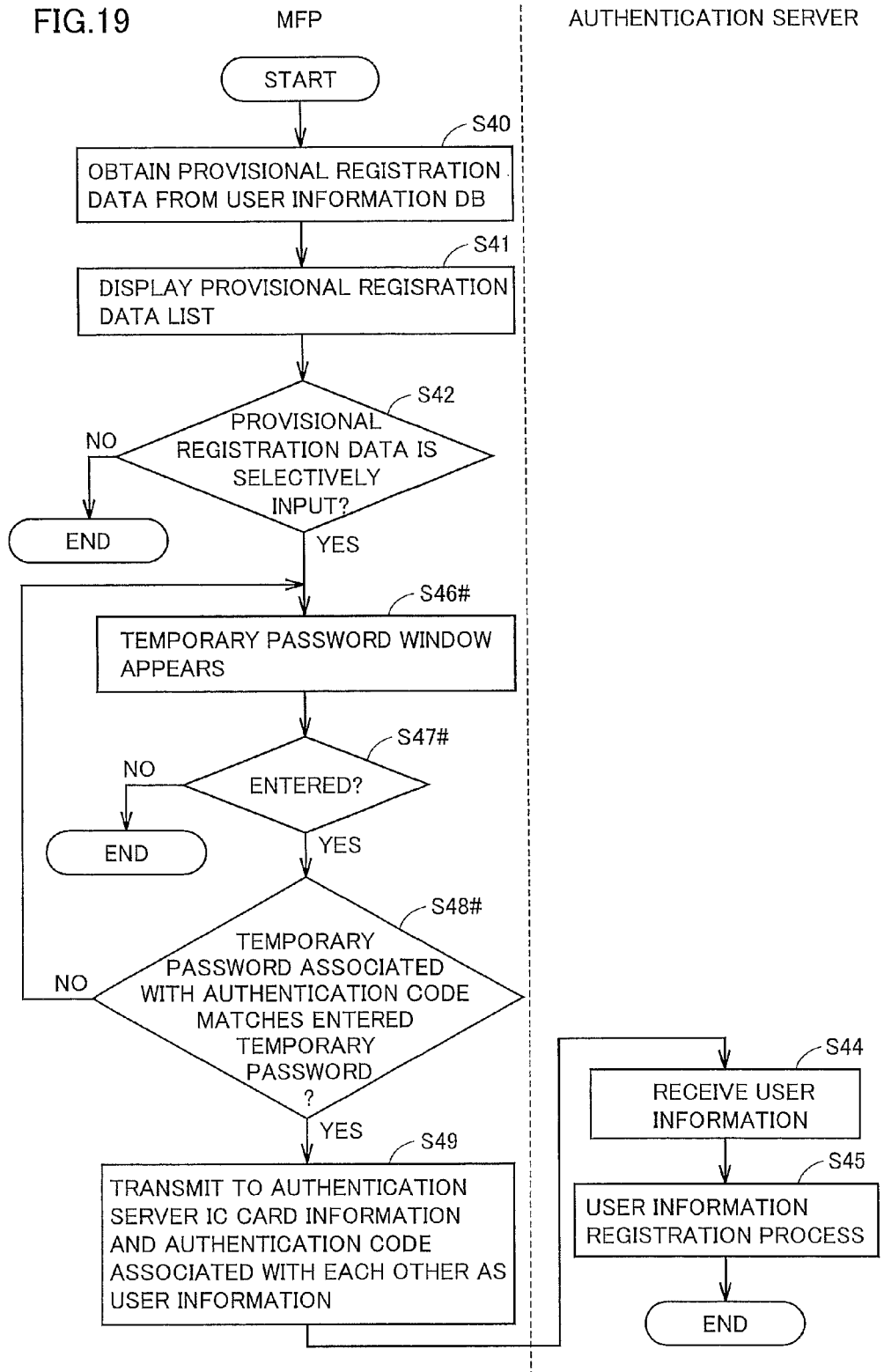
FIG. 19 is a flowchart illustrating a full registration process in accordance with a second modification of the present invention.

Referring to FIG. 19, the full registration process in accordance with the second modification of the first embodiment of the present invention differs from the flowchart illustrated in FIG. 17 in that step S46 is replaced with step S46#.

Specifically, a process of displaying a temporary password entry window is executed in place of displaying the password entry window (step S46#).

Using FIG. 20, a temporary password entry window 700# will be described.

Figure 20:
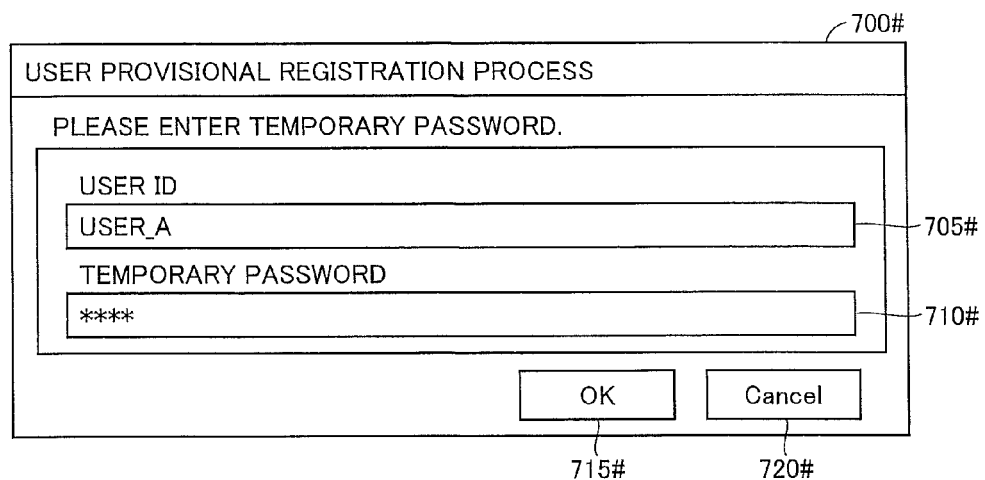
FIG. 20 is an illustration of a temporary password entry window.

Referring to FIG. 20, in temporary password entry window 700#, here, "Please enter the temporary password" is displayed together with entry fields 705# and 710#. Specifically, entry field 705# allows the user to enter the user ID using the ten-key pad or the like, and entry field 710# allows the user to enter a temporary password. In this example, since the user ID has been selected in the provisional registration data list window, the selected user ID is displayed in entry field 705#. The user ID displayed in entry field 705# may be changed to another ID.

Referring to FIG. 19 again, next, it is determined whether an input is made or not after the temporary password entry window is displayed in step S46# (step S47#).

Specifically, in temporary password entry window 700#, controller 116 determines whether a password entry is made in entry field 71 0# and an "OK" button 715# is pressed or not. If a "Cancel" button 720# is pressed in temporary password entry field 700# in FIG. 20, the process ends (END).

If it is determined that an input is made in step S47#, then it is determined whether or not the temporary password associated with the authentication code matches the input temporary password (step S48#). Specifically, controller 116 determines whether or not the temporary password associated with the authentication code corresponding to the selected provisional registration data matches the input temporary password.

If the temporary password associated with the authentication code matches the input temporary password in step S48, controller 116 transmits to authentication server 300 the user information in which the IC card information or the biological information and the authentication code are associated with each other (step S49).

On the other hand, if the temporary password associated with the authentication code does not match the input temporary password in step S48, the temporary password entry window in step S46# appears again.

The process after step S49 is similar to the one illustrated in the flowchart in FIG. 14 and therefore the detailed description will not be repeated.

According to the technique in accordance with the second modification of the first embodiment of the present invention, when provisional registration data is selected, the determination process is further added as to whether or not the temporary password entered by the user matches the temporary password associated with the authentication code is further added, thereby preventing an erroneous operation of the other persons conducting full registration of wrong provisional registration data when selectively inputting the provisional registration data, and allowing the user to register his desired provisional registration data.

In addition, even in the case where a complicated password is set in terms of security, the temporary password used only when the provisional registration data is selectively input can be set easily, thereby alleviating the cumbersome input operation and improving the user's convenience, Third Modification of First Embodiment In the technique in accordance with a third modification of the first embodiment of the present invention, a parameter is further added as user information at the time of full registration.

Using FIG. 21, the full registration process in accordance with the third modification of the first embodiment of the present invention will be described.

Figure 21:
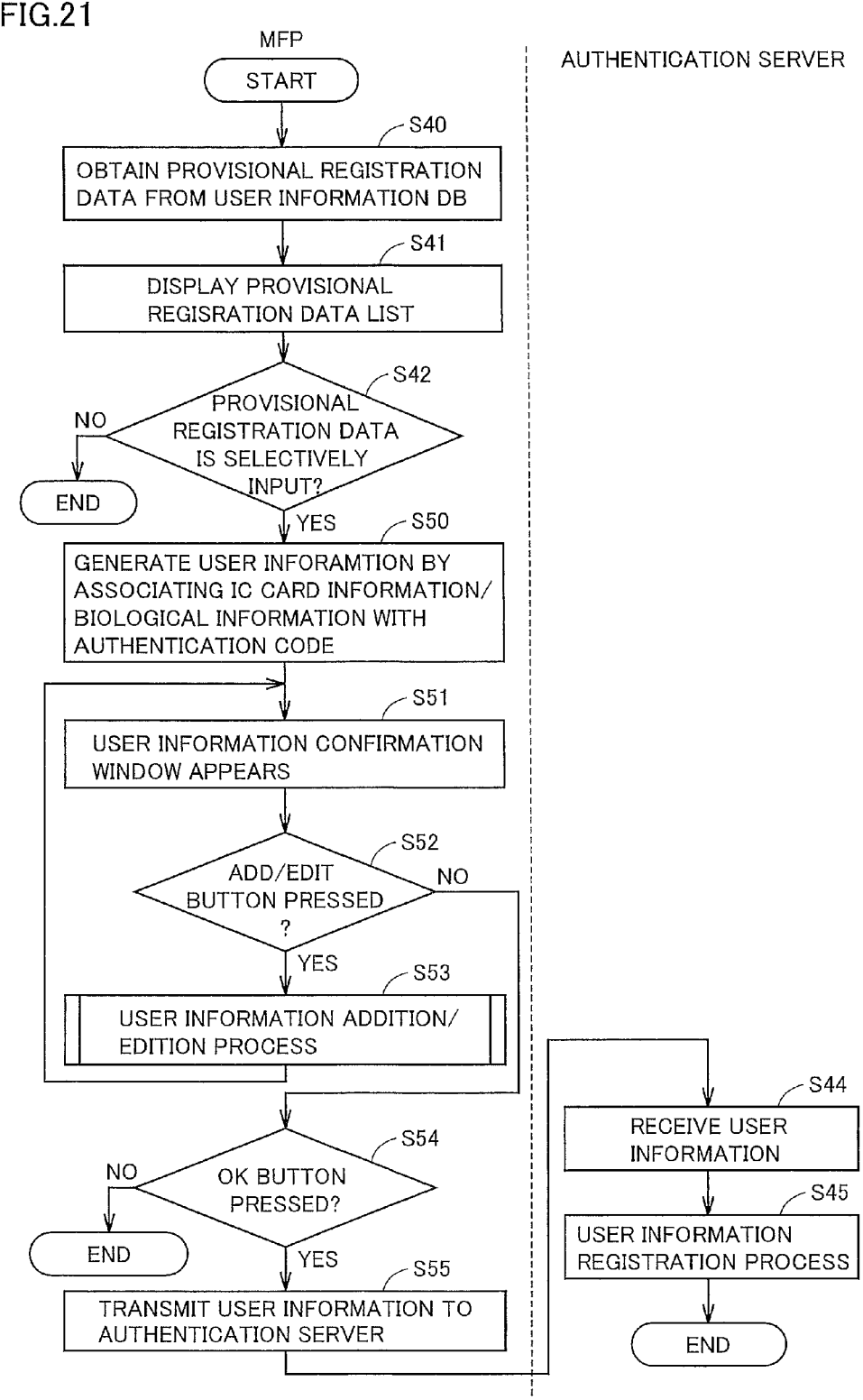
FIG. 21 is a flowchart illustrating a full registration process in accordance with a third modification of the first embodiment of the present invention.

Referring to FIG. 21, the full registration process in accordance with the third modification of the first embodiment of the present invention differs from the flow of the full registration process in the first embodiment as illustrated in FIG. 14 in that a parameter etc. such as biological information may be further added as user information during generation of user information after the provisional registration data is selectively input.

Specifically, if the provisional registration data is selectively input in step S42, controller 116 generates user information in which IC card information or biological information is associated with the authentication code (step S50).

Then, a user information confirmation window appears (step S51).

Using FIG. 22, a user information confirmation window 800 in accordance with the third modification of the first embodiment of the present invention will be described.

Referring to FIG. 22, here, a user ID, a password, and a card ID as IC card information are associated with each other, and in addition, biological information #1, biological information #2, and biological information #3 can be associated therewith in the respective fields.

When the user presses an "OK" button 805 in user information confirmation window 800, the user information having the contents confirmed in user information confirmation window 800 is transmitted to authentication server 300.

On the other hand, when the user presses an "add/edit" button 810, an addition/edition process can be additionally executed on the user information displayed in user information confirmation window 800.

When the user presses a "Cancel" button 815, the user can end the full registration process.

Referring to FIG. 21 again, after the user information confirmation window appears in step S51, it is determined whether "add/edit" button 810 is pressed or not (step S52).

If "add/edit" button 810 is pressed in step S52, the user information addition/edition process is executed (step S53).

On the other hand, if "add/edit" button 810 is not pressed in step S52, then it is determined whether "OK" button 805 is pressed or not (step S54).

Then, if "OK" button 805 is pressed in step S54, the user information is transmitted to authentication server 300 (step S55).

The following process is similar to the one illustrated in FIG. 14 and therefore the detailed description will not be repeated.

Using FIG. 23, the user information addition/edition process will be described.

Referring to FIG. 23, if "add/edit" button 810 is pressed, then a user information addition/edition window appears (step S60).

Using FIG. 24, a user information addition/edition window 850 will be described.

Referring to FIG. 24, in user information addition/edition window 850, here "Please select the item you wish to add/edit" is displayed, and in addition, selectable items of "user ID," "password," "card ID," "biological information #1," "biological information #2," and "biological information #3" are displayed, by way of example.

In user information addition/edition window 850, the displayed items can be selected arbitrarily.

Referring to FIG. 23 again, it is determined whether a selection input is made or not in user information addition/edition window 850 (step S61). Specifically, controller 116 determines whether a selection is made or not from the displayed items in the above-noted user information addition/edition window 850. If a "Cancel" button 855 is pressed, it is determined that a selection input is not made, and the process ends (END).

If a selection input is made from the displayed items in user information addition/edition window 850, it is determined whether the input is to designate an addition process or not (step S62).

Specifically, if the item having no information stored is selected among the displayed items in the above-noted user information addition/edition window 850, controller 116 determines that an addition process is designated.

On the other hand, if the item having information stored is selected among the displayed items in the above-noted user information addition/edition window 850, controller 116 determines that an edition process is designated. Then, the edition process is executed (step S66).

First, the addition process will be described. In this example, the item of biological information #1 is designated, by way of example.

If it is determined that the addition process is designated in step S62, it is determined whether biological information is sensed or not (step S63). Specifically, it is determined whether biological information is sensed or not by biological information reader 122 in biological information sensing region 60.

If biological information is sensed in step S63, the biological information is obtained (step S64). Specifically, controller 116 obtains the biological information output from biological information reader 122.

On the other hand, if biological information is not sensed in step S63, the process ends (END). For example, when biological information is not sensed by biological information reader 122 for a certain period of time (time-out), the addition process may be ended.

Then, after biological information is obtained in step S64, controller 116 generates user information (step S65).

Specifically, controller 116 generates user information in which the biological information obtained in step S64 is added. The process then ends (END).

Next, the edition process will be described.

In the case of the edition process, after step S66, it is determined whether an input in the item selected by the user is made or not (step S67).

Specifically, a not-shown input field is newly provided for the edition process. If the user inputs information in the input field using the ten-key pad or the like, controller 116 determines that an input is made.

Then, if it is determined that an input is made in step S67, controller 116 obtains the input information (step S68) and executes a process of overwriting information (step S69). For example, the edition process may be performed on "user ID," "password," "card ID," etc. It is noted that a process of deleting information may also be performed in the edition process.

After step S69, user information is generated (step S65). Specifically, controller 116 generates user information that is overwritten in step S69. The process then ends (END).

Then, the process returns to step S51 again, the user information confirmation widow appears. The following process is similar to the one described above and therefore the detailed description will not be repeated.

In the technique in accordance with the third modification of the first embodiment of the present invention, when full registration of user information is conducted, the user information can be confirmed, thereby preventing erroneous registration.

Moreover, the parameters of the user information can be added or edited. For example, the password entered as provisional registration data in client PC 200 can be changed later, thereby improving the user's convenience.

In this example, three biological information #1, #2, #3 can be added to user information for full registration. Specifically, for example, fingerprint data may be registered in association with each of the index finger, the middle finger, and the fourth finger for fingerprint authentication.

In this regard, a plurality of parameters for authentication, in this example, three fingerprint data are registered so that billing management processes may vary among the respective fingerprint authentication using the index finger, the middle finger, and the fourth finger. The present invention is not limited to the billing management process. The parameter may be set in association with a particular job to allow a process to be executed, and the present invention is not limited to any particular usage.

In this example, biological information is added as additional user information. However, the present invention is not limited to biological information. A password may be added or the personal data of the user may be added. The present invention is not limited to any particular parameters to be added.

Second Embodiment

In a second embodiment of the present invention, when the user executes a full registration process in accordance with the first embodiment above, a printing process is performed in which print data is transmitted from client PC 200 to MFP 100.

Using FIG. 25, a process of transmitting print data from client PC 200 will be described.

Referring to FIG. 25, in the case where the print data transmission process is executed, a print command including the authentication code is generated (step S70).

Specifically, in print setting window 500 illustrated in FIG. 7, it is supposed that "normal print" is designated as the setting of "output method."

In this case, printer driver 402 generates a print command in print job generation portion 410 based on "orientation of document," "document size," "paper size," "output method," "number of copies," etc. as set in print setting window 500 and incorporates the authentication code input in the user provisional registration process into the print command, if the user provisional registration process has been executed in "user provisional registration." Specifically, the authentication code stored in HDD 211 is incorporated into the print command.

The print data including the print command is then transmitted to MFP (step S71). The process then ends (END).

Specifically, print job generation portion 410 generates print job data having the print command generated in step S70. Printer driver 402 then generates print data including the print job data. In doing so, image generation portion 405 of printer driver 402 generates image data subjected to a printing process. It is assumed that the print data includes the image data.

Using FIG. 26, a process in the case where MFP 100 receives print data including the print command will be described.

Referring to FIG. 26, first, it is determined whether print data including the print command is received or not (step S75). Specifically, controller 116 determines whether the print data received through network controller 108 includes the print command or not.

If print data including the print command is received in step S75, controller 116 stores the print data into print data memory 106 (step S76). The process then ends (END).

Using FIG. 27, a printing process in the case where print data is stored in print data memory 106 will be described.

Figure 27:
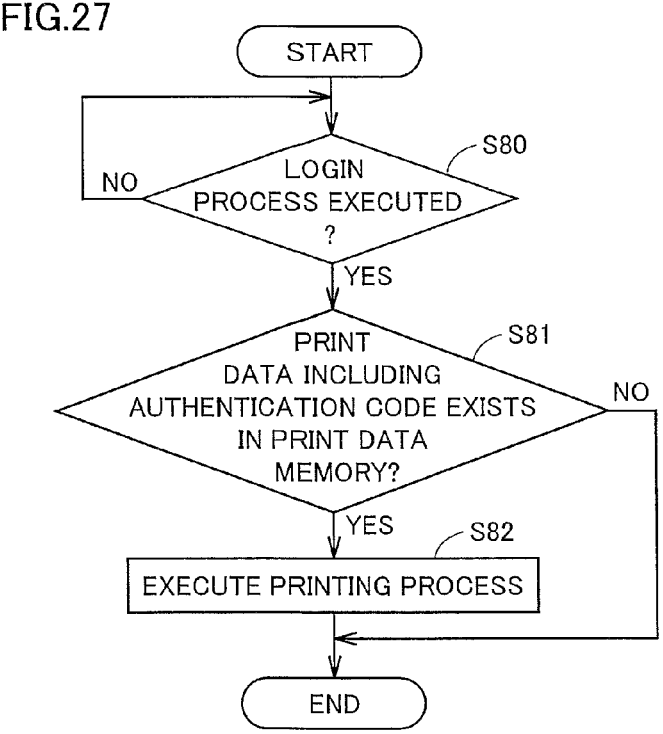
FIG. 27 is a flowchart illustrating a printing process in a case where print data is stored in a print data memory.

Referring to FIG. 27, it is determined whether a login process is executed or not (step S80).

Specifically, controller 116 determines whether a login process is executed or not through the user authentication process as illustrated in the flowchart in FIG. 13 in the first embodiment.

If the login process is executed, then it is determined whether print data including the authentication code exists in print data memory 106 (step S81). Specifically, controller 116 refers to print data memory 106 to determine whether or not there exists print data including the print command having the authentication code that matches the authentication code of the user information included in the authentication success information stored in a not-shown memory in the user authentication process.

If it is determined that print data including the authentication code exists in print data memory 106 in step S81, a process of printing the print data is executed (step S82). Specifically, a process of printing the image data included in the print data is executed in printer 104. The process then ends (END).

On the other hand, if print data including the authentication code does not exist in print data memory 106 in step S81, the process ends (END).

This process allows execution of the process of printing print data including the authentication code when the login process is performed according to, for example, the user's IC card for the print data transmitted from client PC 200 to MFP 100.

Therefore, the user can transmit the print data including the authentication code to MFP 100 without entering the authentication code, at client PC 200.

In this regard, the user can execute the process of printing the print data transmitted from his own client PC 200 when performing the login process, for example, according to the IC card.

More specifically, the user can execute the print data printing process safely without allowing the other persons to view the print data transmitted from his client PC 200.

In particular, in the technique in accordance with the second embodiment, when the user provisional registration process is executed, the printing process can be executed later without an operation of inputting the authentication code and the like. Therefore, the convenient printing process can be executed without the need for cumbersome procedures.

Third Embodiment

In the embodiments above, when the user provisional registration process is executed, the print data including the authentication code is transmitted from client PC 200 so that the provisional registration data is registered in MFP 100.

In the third embodiment, when the user provisional registration process is executed, provisional registration data is registered in authentication server 300. User information DB 306 of authentication server 300 in accordance with the third embodiment stores the provisional registration data for which the user provisional registration process has been executed, in addition to the fully registered user information.

Figure 28:
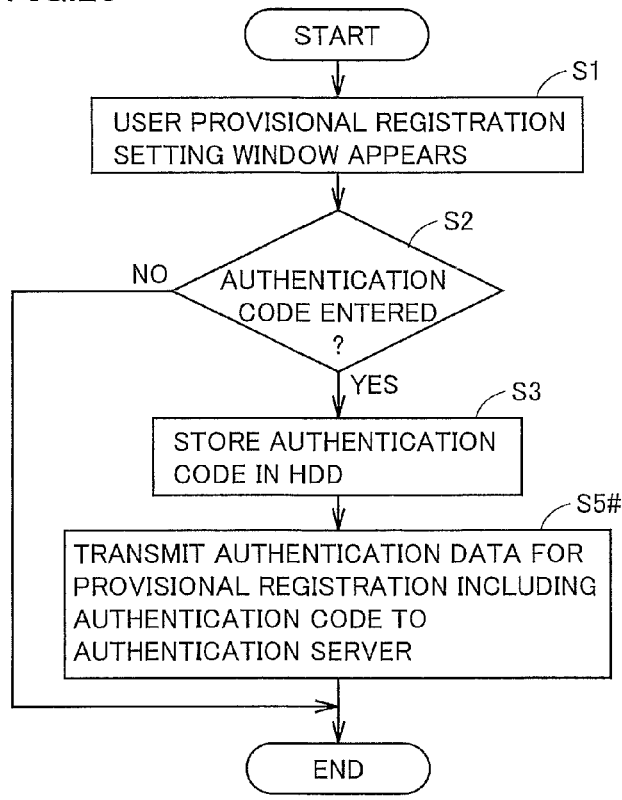
FIG. 28 is a flowchart illustrating a user provisional registration process in accordance with a third embodiment of the present invention.

Using FIG. 28, the user provisional registration process in accordance with the third embodiment of the present invention will be described, Referring to FIG. 28, as compared with the flowchart of the user provisional registration process illustrated in FIG. 8, steps S4 and S5 are replaced with step S5#.

Specifically, the user provisional registration setting window appears (step S1). Controller 116 determines whether the authentication code is entered or not (step S2). If the authentication code is entered, controller 116 then stores the authentication code in HDD 211 (step S3).

Then, controller 116 transmits the authentication data for provisional registration including the authentication code to authentication server 300 (step S5#). The process then ends (END).

In the technique in accordance with the first embodiment above, the print data including the print job data described by a command that can be recognized by MFP is transmitted, for MFP is the receiver. However, in the third embodiment of the present invention, without being limited to print data, any authentication data for provisional registration that can be recognized by authentication server 300 may be transmitted as long as it can be recognized by authentication server 300, for the authentication server is the receiver.

Using FIG. 29, the user provisional registration process in authentication server 300 will be described.

Figure 29:
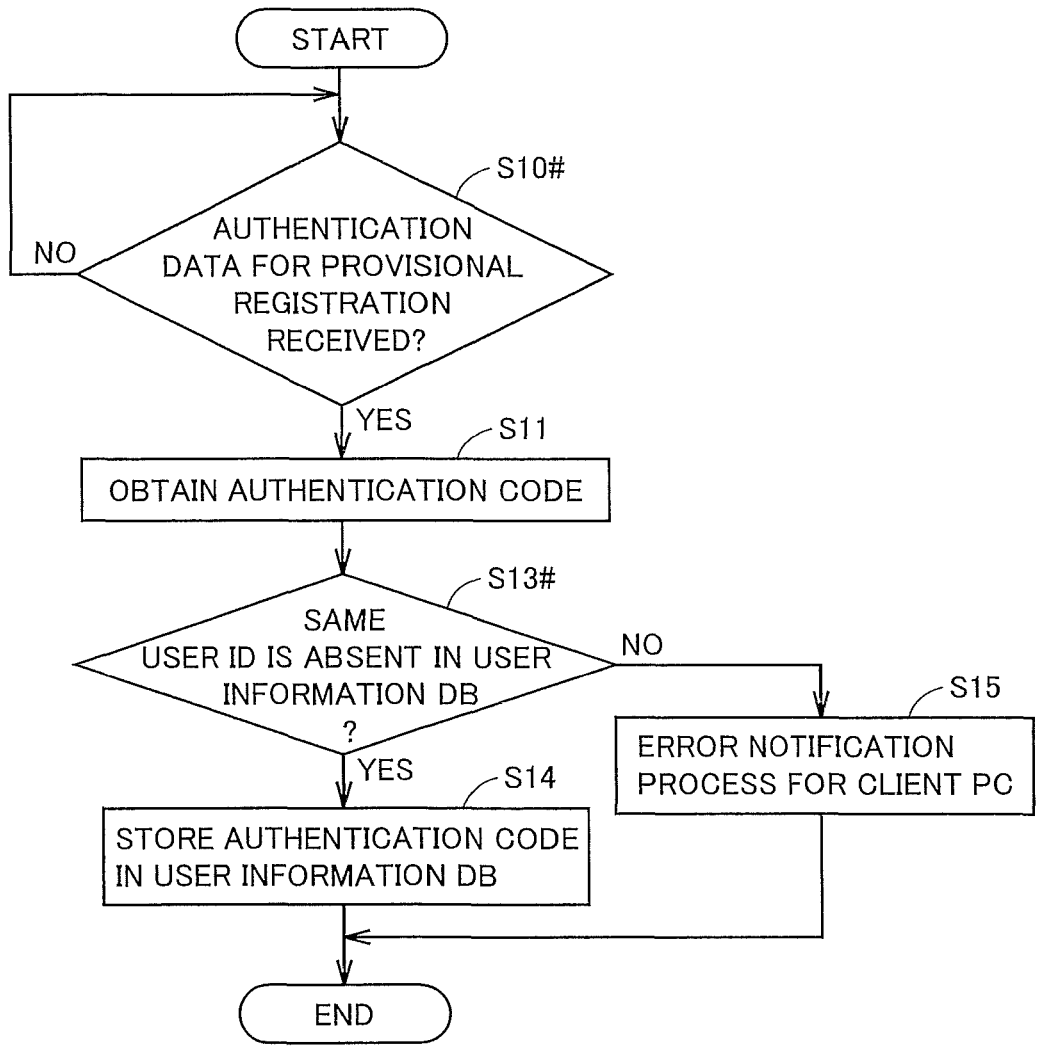
FIG. 29 is a flowchart illustrating a user provisional registration process in the authentication server.

Referring to FIG. 29, first, it is determined whether authentication data for provisional registration is received or not (step S10#). Specifically, at authentication server 300, user information management portion 304 determines whether the authentication data for provisional registration is received or not through reception portion 324 of network controller 308.

If the authentication data for provisional registration is received, the authentication code is then obtained (step S11). Specifically, user information management portion 304 obtains the authentication code from the received authentication data.

Then, user information management portion 304 determines whether the same user ID is absent or not in user information database 306 (step S13#). Specifically, user information management portion 304 of authentication server 300 refers to user information DB 306 to determine whether the user information or the provisional registration data having the same user ID is registered or not.

If user information management portion 304 determines that the same user ID is absent in user information database 306 in step S13#, then user information management portion 304 stores the authentication code in user information database (DB) 306 (step S14). The process then ends (END).

On the other hand, if it is determined that the same user ID is present in user information database 306 in step S13#, user information management portion 304 executes an error notification process for client PC 200 (step S15). The process then ends (END).

In this process, if authentication server 300 receives the authentication data for provisional registration, it is determined whether the same user ID with the authentication code included in the authentication data exists or not in user information DB 306 of authentication server 300. If the same user ID does not exist, the authentication code including the user ID is registered as provisional registration data in user information DB 306 of authentication server 300.

On the other hand, if the same user ID exists in user information DB 306 of authentication server 300, the error notification process is executed for client PC 200, so that an transmission error is displayed on display portion 205 of client PC 200 to indicate the user provisional registration process is failed.

At client PC 200, if the user recognizes that the user provisional registration process for the entered authentication code cannot be executed successfully, according to the error notification process from authentication server 300, the user executes the user provisional registration process again according to another authentication code, so that the provisional registration data for the user ID different from the user ID stored in user information DB 306 of authentication server 300 is stored in user information database 306.

Using FIG. 30, the user authentication process in MFP 100 in accordance with the third embodiment of the present invention will be described.

Figure 30:
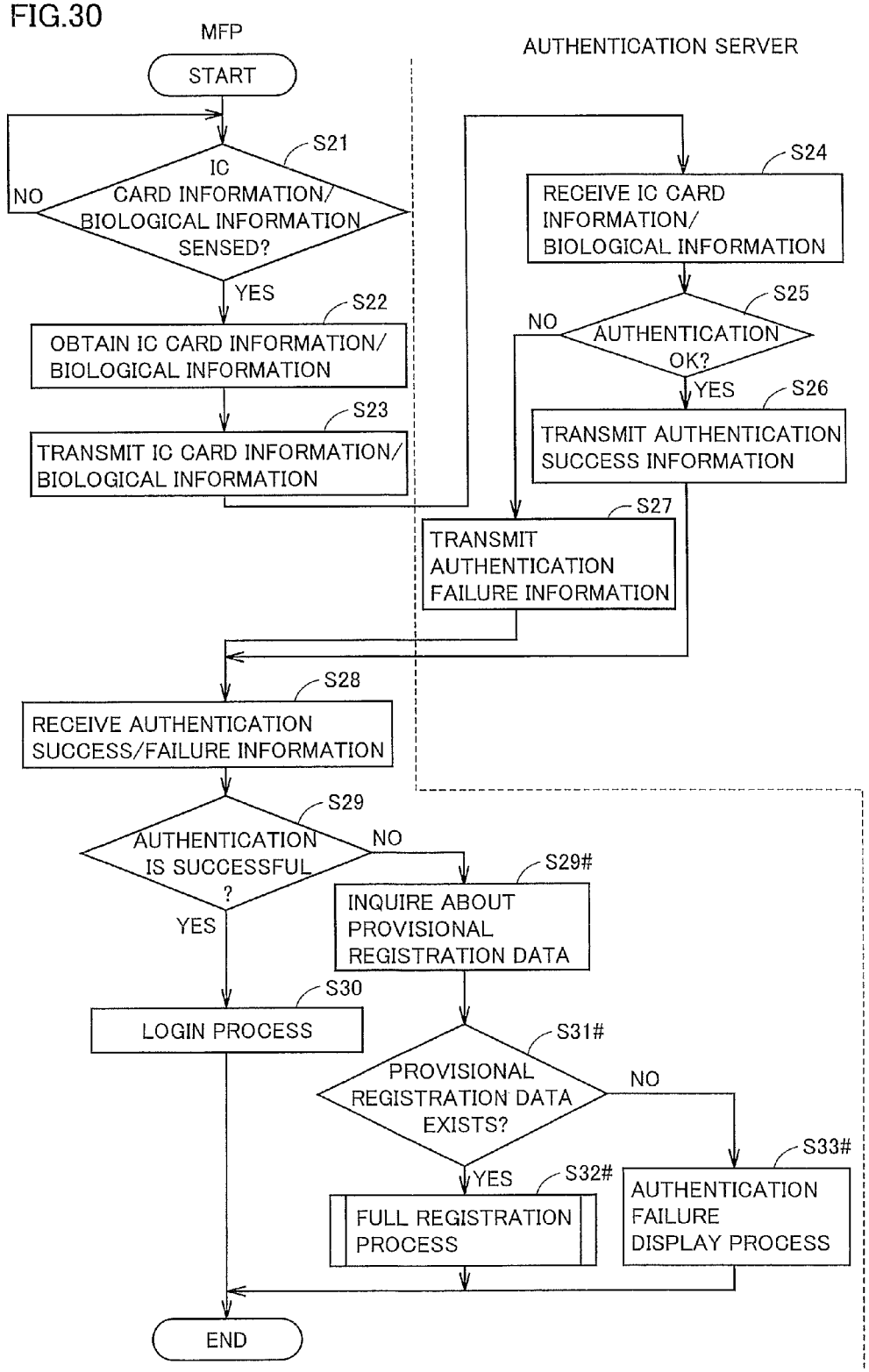
FIG. 30 is a flowchart illustrating a user authentication process in MFP in accordance with the third embodiment of the present invention.

Referring to FIG. 30, the process flow of the user authentication process from step S21 to step S30 is similar to the one illustrated in FIG. 13 and therefore the detailed description will not be repeated.

If the authentication is failed in step S29, then an inquiry about the provisional registration data is made (step S29#). Specifically, controller 116 asks user information management portion 304 of authentication server 300 for the information of the provisional registration data stored in user information DB 306.

In response to the inquiry about the provisional registration data from controller 116, user information management portion 304 transmits the provisional registration data to MFP 100, if the provisional registration data is stored in user information DB 306. On the other hand, if the provisional registration data is not stored in user information DB 306, the result that no provisional registration data exists is transmitted to MFP 100

Then, it is determined whether provisional registration data exists or not (step S31#).

Specifically, controller 116 determines whether the provisional registration data exists or not, based on the transmission result from user information management portion 304 of authentication server 300.

Specifically, if the provisional registration data is sent from authentication server 300, it is determined that the provisional registration data exists, On the other hand, if the determination result that no provisional registration data exists is transmitted, it is determined that no provisional registration data exists.

If the provisional registration data exists in user information DB 306 in step S31#, the process proceeds to the full registration process (step S32#).

On the other hand, if no provisional registration data exists in step S31#, a process of displaying that the authentication failed is executed (step S33). The process then ends (END).

Using FIG. 31, the user information full registration process in accordance with the third embodiment of the present invention will be described.

Figure 31:
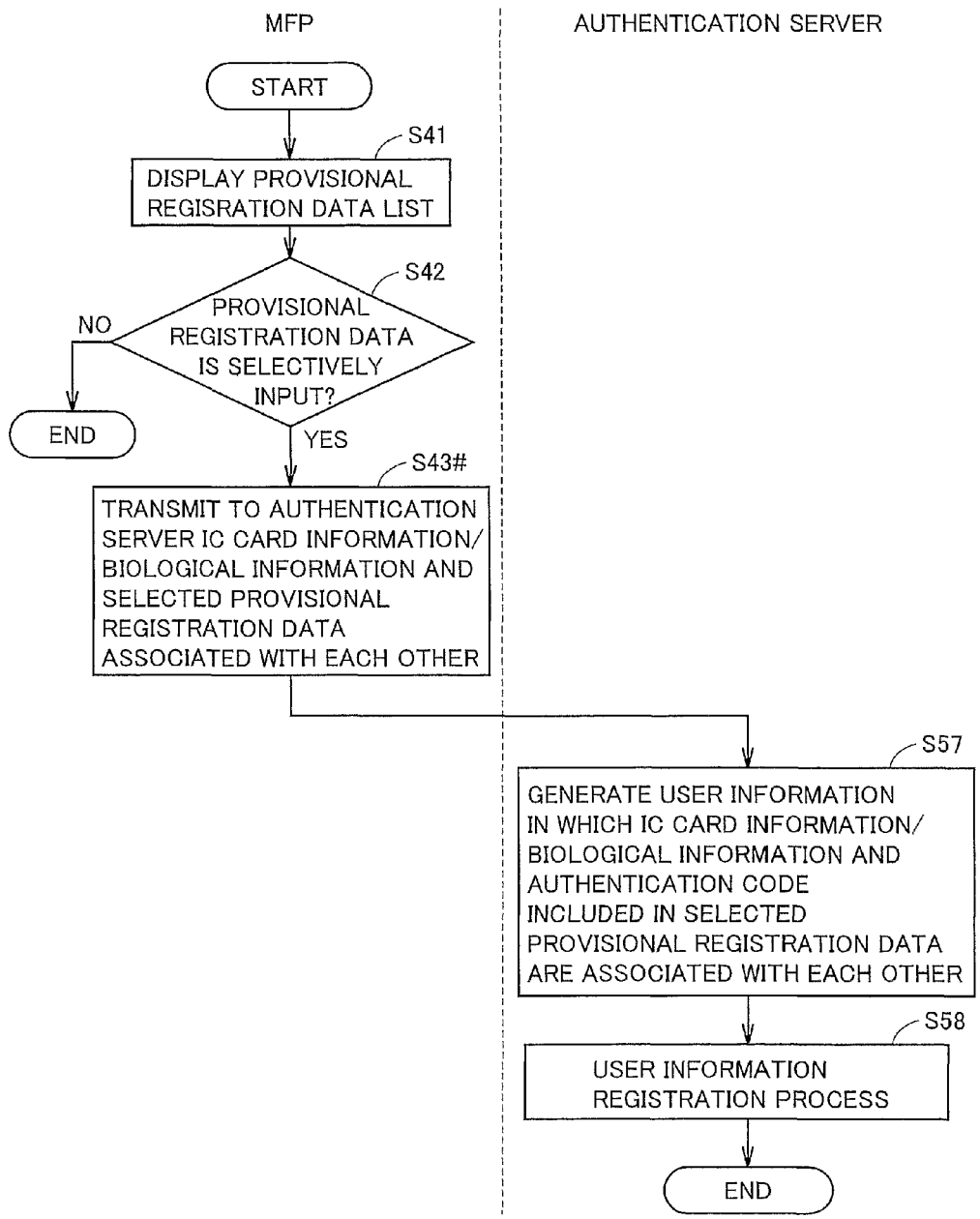
FIG. 31 is a flowchart illustrating a user information full registration process in accordance with the third embodiment of the present invention.

Referring to FIG. 31, first, a list of provisional registration data is displayed, based on the obtained provisional registration data transmitted from authentication server 300 (step S41).

Specifically, the provisional registration data list window as illustrated in FIG. 15 appears.

Then, controller 116 determines whether the provisional registration data is selectively input or not (step S42). Then, if the provisional registration data is selectively input in step S42, controller 116 transmits IC card information or biological information and the selected provisional registration data associated with each other to authentication server 300 (step S43#).

User information management portion 304 then generates user information in which the IC card information or the biological information is associated with the authentication code included in the selected provisional registration data (step S57).

Then, user information management portion 304 executes a process of registering the generated user information (step S58). Specifically, the user information is stored in user information DB 306. The process then ends (END).

In short, the technique in accordance with the third embodiment of the present invention allows the provisional registration data to be registered in authentication server 300.

Therefore, in such a case in that a plurality of MFPs 100 are connected via network 400, the full registration process according to the similar technique can be executed at any MFP.

In this example, the authentication data for provisional registration is stored in user information DB 306 and provisionally registered in authentication server 300. However, a so-called pull print server which spools and manages print data may be provided and connected to the network. The print data including the authentication code as explained in the first embodiment is sent to the pull print server, so that the provisional registration data is registered in the pull print server, in a manner similar to the technique in accordance with the third embodiment of the present invention. In this case also, when a plurality of MFPs 100 are connected via network 400, for example, the full registration process can be executed at any MFP, in accordance with the technique as described above.

Fourth Embodiment

In the first to third embodiments above, authentication server 300 is used to execute the user authentication process by registering the user information in authentication server 300. In a fourth embodiment of the present invention, a technique of executing the user authentication process without using authentication server 300 will be described.

Figure 32:
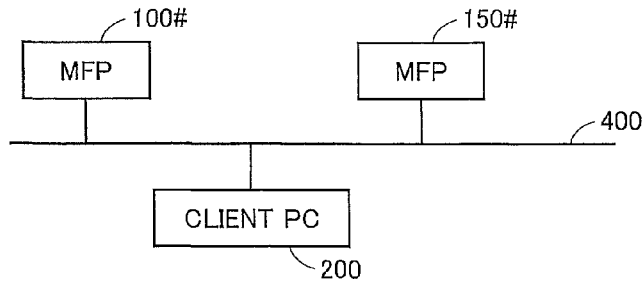
FIG. 32 is a schematic diagram illustrating an authentication system in accordance with a fourth embodiment of the present invention.

Using FIG. 32, an authentication system in accordance with the fourth embodiment of the present invention will be described. Referring to FIG. 32, the authentication system in accordance with the fourth embodiment of the present invention includes MFPs 100# and 150# serving as a kind of authentication apparatus authenticating IC cards, and client PC 200.

In the fourth embodiment, the user information full registration process is executed and the user authentication process is executed in MFPs 100#, 150#.

MFPs 100#, 150# and client PC 200 are connected via network 400 so that they can communicate with each other.

Using FIG. 33, a configuration of MFP 100# in accordance with the fourth embodiment of the present invention will be described.

Figure 33:
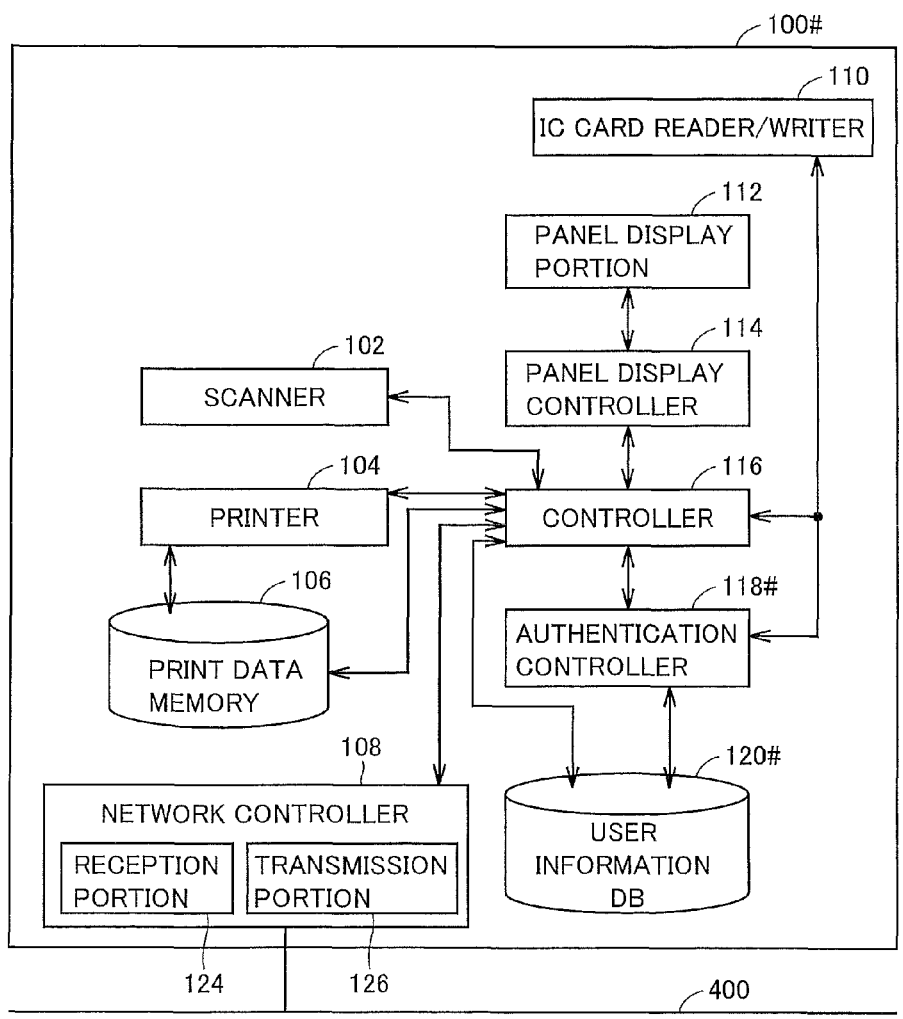
FIG. 33 is a schematic block diagram illustrating a configuration of MFP in accordance with the fourth embodiment of the present invention.

Referring to FIG. 33, MFP 100# in accordance with the fourth embodiment of the present invention differs from MFP 100 in FIG. 2 in that biological information reader 122 is not provided, that authentication controller 118 is replaced with an authentication controller 118#, and that user information DB 120 is replaced with user information DB 120#. The other configuration is similar and therefore the detailed description will not be repeated.

Specifically, as compared with user information DB 120, user information DB 120# stores the fully registered user information, together with the provisional registration data for which the user provisional registration process has been executed.

Authentication controller 118# executes the user authentication process based on the user information stored in user information DB 120#.

The configuration of MFP 150# is similar to the configuration of MFP 100#. The configuration of client PC 200 is basically similar to that of client PC 200 in accordance with the first embodiment of the present invention, and therefore the detailed description will not be repeated.

The process of transmitting print data including the authentication code from client PC 200 to MFP 100# and storing the authentication code in user information DB 120#, as illustrated in FIG. 8 and FIG. 11, is similar to the one illustrated in the first embodiment above, and therefore the detailed description will not be repeated.

Using FIG. 34, the user authentication process in MFP 100# in accordance with the fourth embodiment of the present invention will be described.

Figure 34:
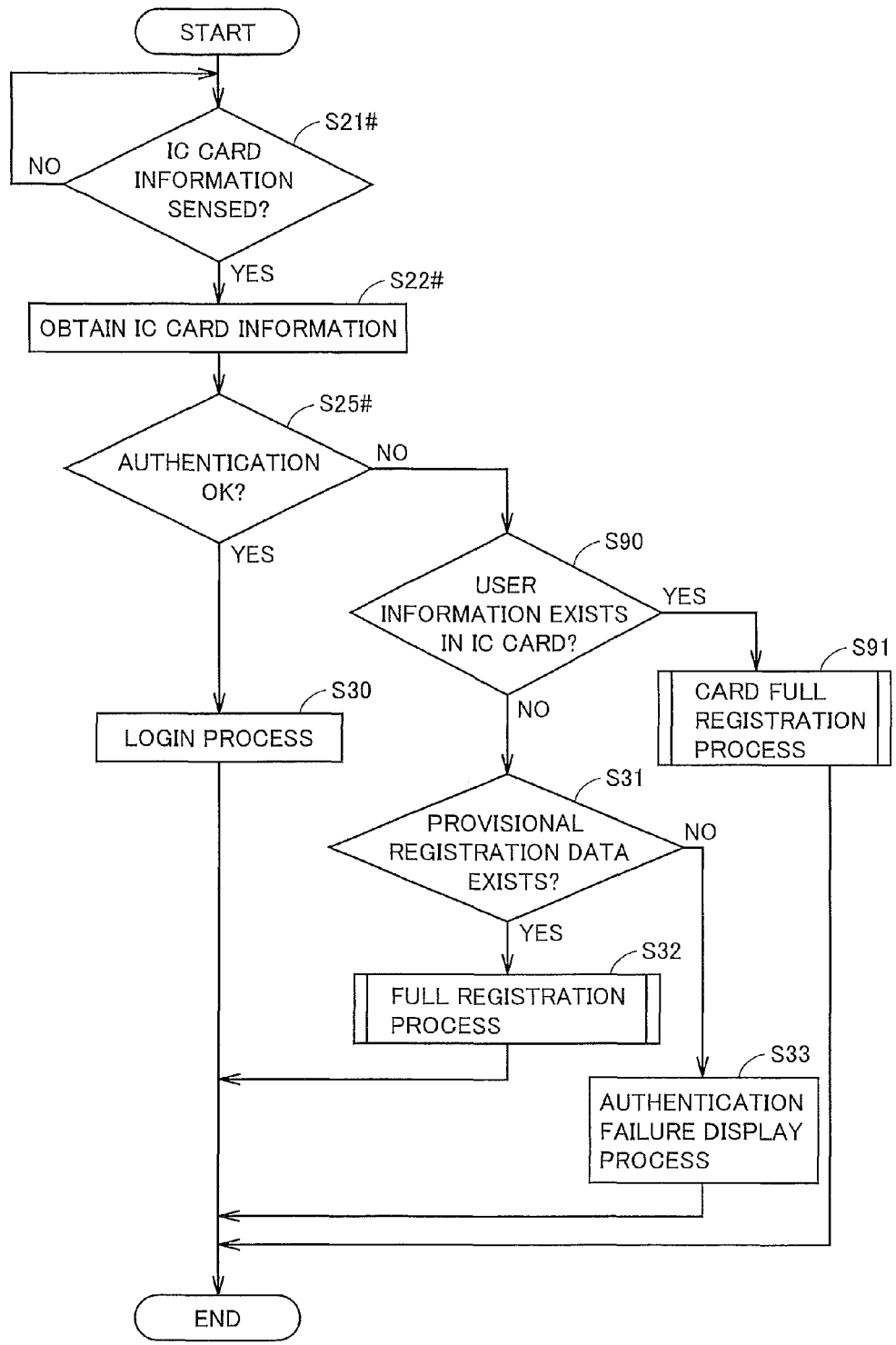
FIG. 34 is a flowchart illustrating a user authentication process in MFP in accordance with the fourth embodiment of the present invention.

Referring to FIG. 34, first, it is determined whether IC card information is sensed or not (step S21#). Specifically, it is determined whether an IC card is sensed or not by IC card reader/writer 110 in the above-mentioned IC card placement region 50.

If IC card information is sensed in step S21#, then the IC card information is obtained (step S22#). Specifically, authentication controller 118# obtains the IC card information output from IC card reader/writer 110.

Then, it is determined whether the authentication is OK or not (step S25#). Specifically, authentication controller 118# of MFP 100# determines whether the user information corresponding to the received IC card information is registered or not in user information database 120#. If the same IC card information is registered, it is determined that the authentication is OK. If the same IC card information is not registered, it is determined that the authentication is failed. The result is then output to controller 116.

If the authentication is OK in step S25#, that is, if it is determined that the authentication is successful, based on the authentication result from authentication controller 118#, then controller 116 executes a login process (step S30).

On the other hand, if the authentication is failed in step S25#, that is, if it is determined that the authentication is failed, based on the authentication result from authentication controller 118#, then controller 116 determines whether the user information exists in the IC card (step S90). Specifically, it is determined whether the user information is included in the data output from IC card reader/writer 110.

If it is determined that user information does not exist in the IC card in step S90, controller 116 refers to user information DB 120# to determine whether the provisional registration data exists or not (step S31).

If the provisional registration data exists in user information DB 120# in step S31, the process proceeds to the full registration process (step S32).

On the other hand, if the provisional registration data does not exist in step S31, the process of displaying that the authentication is failed is executed (step S33). The process then ends (END).

On the other hand, if it is determined that the user information exists in the IC card in step S90, the card full registration process is executed (step S91). The process then ends (END).

Using FIG. 35, the full registration process in accordance with the fourth embodiment of the present invention will be described.

Figure 35:
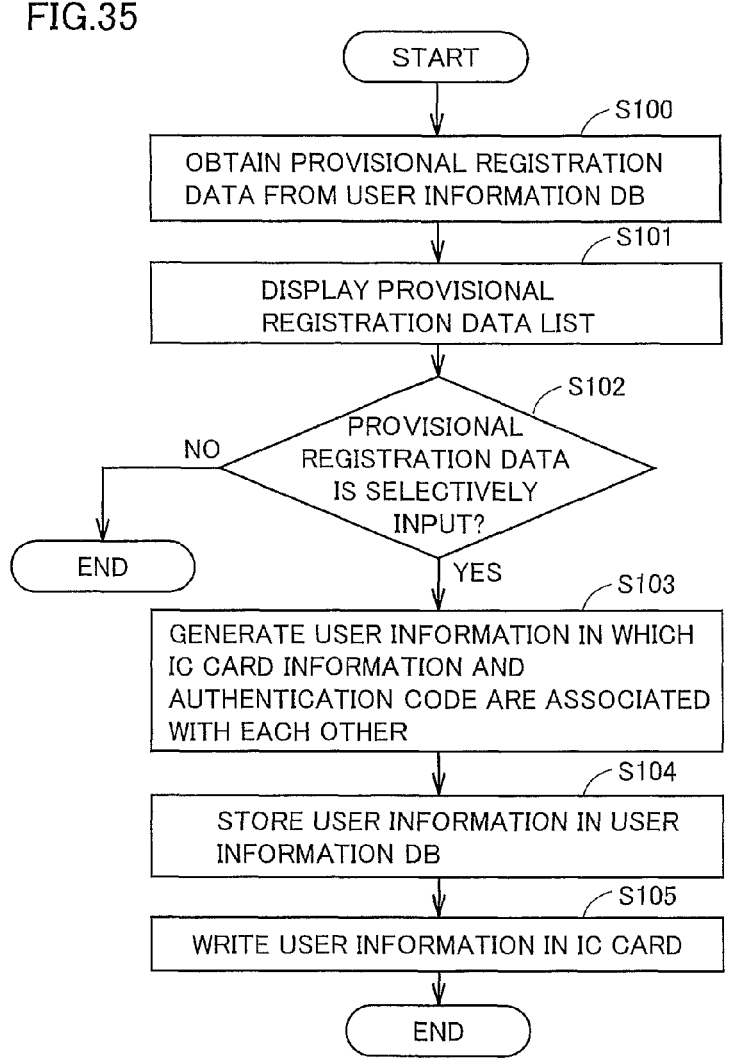
FIG. 35 is a flowchart illustrating a full registration process in accordance with the fourth embodiment of the present invention.

Referring to FIG. 35, first, controller 116 obtains the provisional registration data from the user information database (DB) (step S100).

Then, a list of provisional registration data is displayed (step S101). Specifically, provisional registration data list window 600 as illustrated in FIG. 15 appears.

Then, it is determined whether the provisional registration data is selectively input or not (step S102).

Specifically, if the provisional registration data is selectively input in provisional registration data list window 600 in step S102, controller 116 generates user information in which the IC card information is associated with the authentication code (step S103).

Then, controller 116 stores the user information in user information database 120# (step S104).

The user information is then written into the IC card (step S105). The process then ends (END). Specifically, the generated user information is written into the IC card using IC card reader/writer 110.

This allows the full registration process for executing the user authentication process to be executed in MFP 100#.

When the user uses, for example, the IC card to execute the user authentication process illustrated in FIG. 34 after execution of the full registration process in MFP 100#, it is determined in authentication controller 118# that the authentication is successful. The result is output to controller 116, followed by execution of a login process.

Using FIG. 36, the card full registration process in accordance with the fourth embodiment of the present invention will be described.

Figure 36:
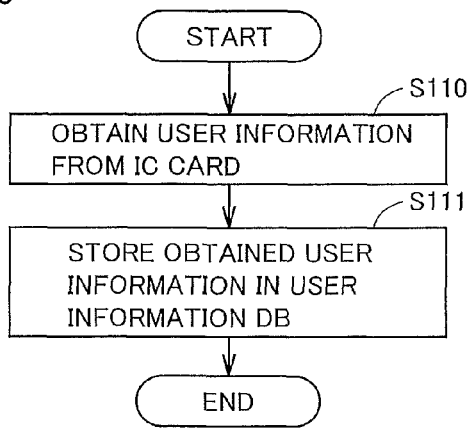
FIG. 36 is a flowchart illustrating a card full registration process in accordance with the fourth embodiment of the present invention.

Referring to FIG. 36, first, the user information is obtained from the IC card (step S110). Specifically, the user information stored in the IC card is obtained using IC card reader/writer 110.

Controller 116 then stores the obtained user information in the user information database (step S111). The process then ends (END).

According to this technique, in the case where the full registration process is executed in MFP 100# as described above and the user authentication process is thereafter executed in another MFP 150#, as the user information is stored in the IC card in step S90, the process proceeds to step S91 so that the user information stored in the IC card is stored in user information DB 120#.

Therefore, the full registration process is allowed at a time in MFP 150#. The user authentication process using the IC card can be executed also in MFP 150#. The same applies to other MFPs.

Accordingly, according to the technique in accordance with the fourth embodiment of the present invention, it is possible to execute the full registration process with a simple operation without using the authentication server and to execute the user authentication process.

In this example, operation panel 10 is provided with IC card placement region 50 for recognizing an IC card. However, the region may be provided at another place, without being limited to the operation panel. The same applies to biological information sensing region 60.

In the case of a noncontact-type IC card, without provision of the region, for example, the user may come close to MFP 100 or 100# so that radio waves are transmitted from the IC card to IC card reader/writer 110 to allow the IC card information to be recognized in IC card reader/writer 110.

It is noted that the authentication apparatus in accordance with the present invention is not limited to MFP and may be a printer, a facsimile machine, or the like. For a controller controlling the authentication apparatus, a program may be provided which allows a computer to function to execute the control as described in the above-noted flows. Such a program may be recorded in a computer readable recording medium such as a flexible disk, a CD-ROM (Compact Disk-Read Only Memory), a ROM (Read Only Memory), a RAM (Random Access Memory), and a memory card, which accompanies a computer, and be provided as a program product. Alternatively, the program may be recorded in a recording medium such as a hard disk contained in a computer. Alternatively, the program may be downloaded via a network.

The program in accordance with the present invention may allow the process to be executed by invoking necessary modules, among program modules provided as a part of Operation System (OS) of a computer, in a prescribed sequence at a prescribed timing. In this case, the aforementioned modules are not included in the program itself and the process is executed in cooperation with OS. The program that does not include such modules may also be included in the program in accordance with the present invention.

Furthermore, the program in accordance with the present invention may be built in a part of another program. In this case, the modules included in another program are not included in the program itself, and the process is executed in cooperation with another program. Such a program built in another program may also be included in the program in accordance with the present invention.

The program product to be provided is installed in a memory such as a hard disk for execution. It is noted that the program product includes the program itself and a recording medium having the program recorded thereon.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An authentication apparatus comprising:
a network reception portion for receiving an authentication code included in a provisional registration command, the provisional registration command being input at a user terminal;
an inquiring unit for inquiring whether information corresponding to the authentication code is stored in an authentication server;
a memory for storing the authentication code received by the network reception portion for provisional registration when the information corresponding to the authentication code is not stored in said authentication server;
a reading device for reading identification data that is card identification information of an IC card or biological information; and
a controller for controlling an authentication apparatus, said controller obtaining an authentication result of said authentication server based on said identification data read by said reading device;
determining whether the authentication code is stored in said memory when the authentication result indicates authentication has failed;
obtaining the authentication code from said memory;
transmitting user information to said authentication server to be registered for full registration in the authentication server when the authentication code has been determined to be stored in said memory and the authentication result indicates authentication has failed, the user information including the identification data read by said reading device and the authentication code obtained from said memory, the identification data and the authentication code being associated with each other; and
executing a user authentication process with said authentication server, based on the user information registered as the full registration in said authentication server.

2. The authentication apparatus according to claim 1, wherein
said controller determines whether said reading device has read identification data or not, and
when said reading device has read identification data, said controller determines whether the user information including identification data that matches the identification data read by said reading device exists or not in said authentication server.

3. The authentication apparatus according to claim 1, wherein
said memory stores a plurality of authentication codes input at a plurality of user terminals and received, and
said controller generates, when a plurality of authentication codes are stored in said memory, said user information in which the identification data read by said reading device and the authentication code selected from among said plurality of authentication codes stored in said memory are associated with each other.

4. The authentication apparatus according to claim 3, wherein
said authentication code includes user identification data and a password,
said authentication apparatus further comprises an input device for accepting an entry of said password from a user, and
said controller determines whether said input device has accepted an entry of the password from a user or not, and
when said input device has accepted an entry of the password, said controller selects an authentication code including a password that matches the password entered by said input device, from among said plurality of authentication codes.

5. The authentication apparatus according to claim 1, wherein
said received authentication code is stored in said memory in association with a password entered at said user terminal,
the authentication apparatus further comprises an input device for accepting an entry of said password from a user, and said controller determines whether said input device has accepted an entry of the password from a user or not, and
when said input device has accepted an entry of the password, said controller obtains an authentication code including a password that matches the password stored in said memory and accepted by said input device.

6. The authentication apparatus according to claim 1, wherein
said reading device reads a plurality of pieces of identification data, and
said controller generates said user information by associating a plurality of pieces of identification data read by said reading device with the authentication code stored in said memory.

7. The authentication apparatus according to claim 1, further comprising:
a reception portion for receiving print data having said authentication code attached thereto; and
a printer for executing a printing process, wherein said controller determines whether said reading device has read identification data or not, when said reading device has read identification data, said controller determines whether the user information including identification data that matches the identification data read by said reading device exists or not in said authentication server, said controller obtains, when the user information including the identification data exists in said authentication server, an authentication code associated with said identification data included in the user information registered in said authentication server, said controller determines whether said reception portion has received print data having said authentication code attached thereto that matches the obtained authentication code, and said controller outputs, when said authentication code attached print data matches the obtained authentication code, the print data to said printer for executing the printing process.

8. The authentication apparatus according to claim 7, wherein said controller determines whether prescribed print data having an authentication code attached thereto was received at said reception portion, and when reception portion has received prescribed print data having an authentication code attached thereto, said controller registers said authentication code attached prescribed print data in said memory.

9. An authentication system comprising:
an information processing apparatus for executing a prescribed function;
an authentication server connected to said information processing apparatus through a network to be used to execute a user authentication process for using said information processing apparatus; and
a user terminal connected through said network for transmitting an authentication code,
said information processing apparatus including
a network reception portion for receiving the authentication code included in a provisional registration command, the provisional registration command being input at the user terminal;
an inquiring unit for inquiring whether information corresponding to the authentication code is stored in the authentication server;
a memory for storing the authentication code received by the network reception portion for provisional registration when the information corresponding to the authentication code is not stored in the authentication server;
a reading device for reading identification data that is card identification information of an IC card or biological information;
an obtaining portion for obtaining an authentication result from the authentication server based on the identification data read by said reading device:
a determination portion for determining whether the authentication code is stored in said memory when the authentication result indicates authentication has failed: and
a transmission portion for transmitting user information to the authentication server to be registered for full registration in the authentication server when the determination portion determines the authentication code has been determined to be stored in said memory and the authentication result indicates authentication has failed, the user information including the identification data read by said reading device and the authentication code received by the network reception portion, the identification data and the authentication code being associated with each other, said authentication server including
a reception portion for receiving the authentication code transmitted from said user terminal and the identification data transmitted from said transmission portion, and
a controller for registering the identification data as user information in association with the authentication code received in said reception portion as full registration,
said controller for executing said user authentication process.

10. An authentication method comprising the steps of:
receiving an authentication code included in a provisional registration command, the provisional registration command being input at a user terminal;
reading identification data that is card identification information of an IC card or biological information;
inquiring whether information corresponding to the authentication code is stored in an authentication server;
storing the received authentication code for provisional registration when the information corresponding to the authentication code is not stored in the authentication server;
obtaining an authentication result from an authentication server based on the identification data;
determining whether said authentication code is stored when the authentication result indicates authentication has failed;
transmitting user information to said authentication server to be registered for full registration in the authentication server when said authentication code has been determined to be stored in said memory and said authentication result indicates authentication has failed, the user information including the identification data being read by said reading step and said authentication code being received at said receiving step, the identification data and the authentication code being associated with each other for registration in an authentication server; and
executing a user authentication process with said authentication server, based on the user information registered as the full registration in said authentication server.

11. A non-transitory recording medium having an authentication program recorded thereon for causing a computer to execute processing including the steps of:
receiving an authentication code included in a provisional registration command, the provisional registration command being input at a user terminal;
reading identification data that is card identification information of an IC card or biological information;
inquiring whether information corresponding to the authentication code is stored in an authentication server;
storing the received authentication code for provisional registration when the information corresponding to the authentication code is not stored in the authentication server;
obtaining an authentication result from an authentication server based on the identification data;
determining whether said authentication code is stored when said authentication result indicates authentication has failed;
transmitting user information to said authentication server to be registered for full registration in the authentication server when said authentication code has been determined to be stored and said authentication result indicates authentication has failed, the user information including the identification data being read by said reading step and said authentication code being received at said receiving step, the identification data and the authentication code being associated with each other for registration in an authentication server; and executing a user authentication process with said authentication server, based on the user information registered as the full registration in said authentication server.

* * * * *